US012194742B2

(12) United States Patent
Shiozawa et al.

(10) Patent No.: US 12,194,742 B2
(45) Date of Patent: Jan. 14, 2025

(54) LIQUID EJECTING HEAD AND LIQUID EJECTING APPARATUS

(71) Applicant: SEIKO EPSON CORPORATION, Tokyo (JP)

(72) Inventors: Yu Shiozawa, Shiojiri (JP); Motoki Takabe, Shiojiri (JP); Hitoshi Takaai, Azumino (JP)

(73) Assignee: SEIKO EPSON CORPORATION (JP)

( * ) Notice: Subject to any disclaimer, the term of this patent is extended or adjusted under 35 U.S.C. 154(b) by 179 days.

(21) Appl. No.: 17/985,397

(22) Filed: Nov. 11, 2022

(65) Prior Publication Data

US 2023/0150259 A1 May 18, 2023

(30) Foreign Application Priority Data

Nov. 12, 2021 (JP) ................................ 2021-184537

(51) Int. Cl.

*B41J 2/055* (2006.01)
*B41J 2/045* (2006.01)
*B41J 2/175* (2006.01)
*B41J 2/18* (2006.01)

(52) U.S. Cl.

CPC .......... *B41J 2/055* (2013.01); *B41J 2/04581* (2013.01); *B41J 2/175* (2013.01); *B41J 2/18* (2013.01)

(58) Field of Classification Search

CPC ......... B41J 2/055; B41J 2/04581; B41J 2/175

See application file for complete search history.

(56) References Cited

U.S. PATENT DOCUMENTS

2007/0008377 A1* 1/2007 Jia ............................ B41J 2/055 347/54
2017/0066247 A1 3/2017 Mizuno et al.
2020/0070510 A1 3/2020 Uchida
2020/0269574 A1 8/2020 Tsukahara et al.

FOREIGN PATENT DOCUMENTS

JP 2017-165051 A 9/2017
JP 2021-130258 A 9/2021

* cited by examiner

*Primary Examiner* — Justin Seo

(74) *Attorney, Agent, or Firm* — Harness, Dickey & Pierce, P.L.C.

(57) ABSTRACT

A liquid ejecting head includes: a nozzle; a pressure chamber; a supply flow channel which is located on one side in a first direction relative to the pressure chamber and through which a liquid is supplied to the pressure chamber; a discharge flow channel which is located on another side in the first direction relative to the pressure chamber and through which the liquid is discharged from the pressure chamber; a supply-side compliance substrate which absorbs a vibration of the liquid in the supply flow channel; and a discharge-side compliance substrate which absorbs a vibration of the liquid in the discharge flow channel. A length of the discharge-side compliance substrate in the first direction is shorter than a length of the supply-side compliance substrate in the first direction.

13 Claims, 20 Drawing Sheets

LIQUID EJECTING HEAD AND LIQUID EJECTING APPARATUS

The present application is based on, and claims priority from JP Application Serial Number 2021-184537, filed Nov. 12, 2021, the disclosure of which is hereby incorporated by reference herein in its entirety.

BACKGROUND

1. Technical Field

The present disclosure relates to a liquid ejecting head and a liquid ejecting apparatus.

2. Related Art

A liquid ejecting head described in JP-A-2021-130258 includes nozzles from which a liquid is ejected, pressure chambers which communicate with the nozzles, a supply flow channel through which the liquid is supplied to the pressure chambers, and a discharge flow channel through which the liquid discharged from the pressure chambers is discharged. The liquid not ejected from the nozzles is discharged from the pressure chambers and flows through the discharge flow channel. The liquid ejecting head includes a supply-side compliance substrate which absorbs vibrations of the liquid inside the supply flow channel, and a discharge-side compliance substrate which absorbs vibrations of the liquid inside the discharge flow channel.

In the liquid ejecting head according to the related art, the supply-side compliance substrate and the discharge-side compliance substrate have the same size. The liquid flowing through the supply flow channel and the liquid flowing through the discharge flow channel differ in flow rate. Thus, for the sizes of the supply-side compliance substrate and the discharge-side compliance substrate, there is still room for consideration.

SUMMARY

A liquid ejecting head according to an aspect of the present disclosure includes: a nozzle from which a liquid is ejected; a pressure chamber in which a pressure is applied to the liquid; a supply flow channel which is located on one side in a first direction relative to the pressure chamber and through which the liquid is supplied to the pressure chamber; a discharge flow channel which is located on another side in the first direction relative to the pressure chamber and through which the liquid is discharged from the pressure chamber; a supply-side compliance substrate which is provided so as to face the supply flow channel and absorbs a vibration of the liquid in the supply flow channel; and a discharge-side compliance substrate which is provided so as to face the discharge flow channel and absorbs a vibration of the liquid in the discharge flow channel. A length of the discharge-side compliance substrate in the first direction is shorter than a length of the supply-side compliance substrate in the first direction.

A liquid ejecting head according to another aspect of the present disclosure includes: a nozzle from which a liquid is ejected; a pressure chamber in which a pressure is applied to the liquid; a supply flow channel which is located on one side in a first direction relative to the pressure chamber and through which the liquid is supplied to the nozzle; a discharge flow channel which is located on another side in the first direction relative to the pressure chamber and through which the liquid is discharged from the nozzle; a supply-side compliance substrate which is provided so as to face the supply flow channel and absorbs a vibration of the liquid in the supply flow channel; and a discharge-side compliance substrate which is provided so as to face the discharge flow channel and absorbs a vibration of the liquid in the discharge flow channel. A length of the discharge-side compliance substrate in the first direction is longer than a length of the supply-side compliance substrate in the first direction.

A liquid ejecting apparatus of the present disclosure has one of the above liquid ejecting heads and a control unit which controls an ejection operation of ejecting a liquid from the liquid ejecting head.

DESCRIPTION OF EXEMPLARY EMBODIMENTS

Embodiments of the present disclosure will be described below with reference to the drawings. It is to be noted that the dimensions and scales of portions in each drawing are made different from the actual ones as appropriate. Also, the embodiments to be discussed below are preferred specific examples of the present disclosure and thus involve various preferred technical limitations, but the scope of the present disclosure is not limited to these embodiments unless there is a particular statement indicating a limitation on the present disclosure in the following description.

In the following description, three directions crossing one another may be described as an X-axis direction, a Y-axis direction, and a Z-axis direction. The X-axis direction includes an X1 direction and an X2 direction which are opposite directions. The X-axis direction is an example of a first direction. The Y-axis direction includes a Y1 direction and a Y2 direction which are opposite directions. The Y-axis direction is an example of a second direction. The Z-axis direction includes a Z1 direction and a Z2 direction which are opposite directions. The Z direction is an example of a third direction. The X-axis direction, the Y-axis direction, and the Z-axis direction are perpendicular to one another. The Z-axis direction is usually a direction along an up-down direction, but does not have to be a direction along the up-down direction.

Embodiment 1

Figure 1:
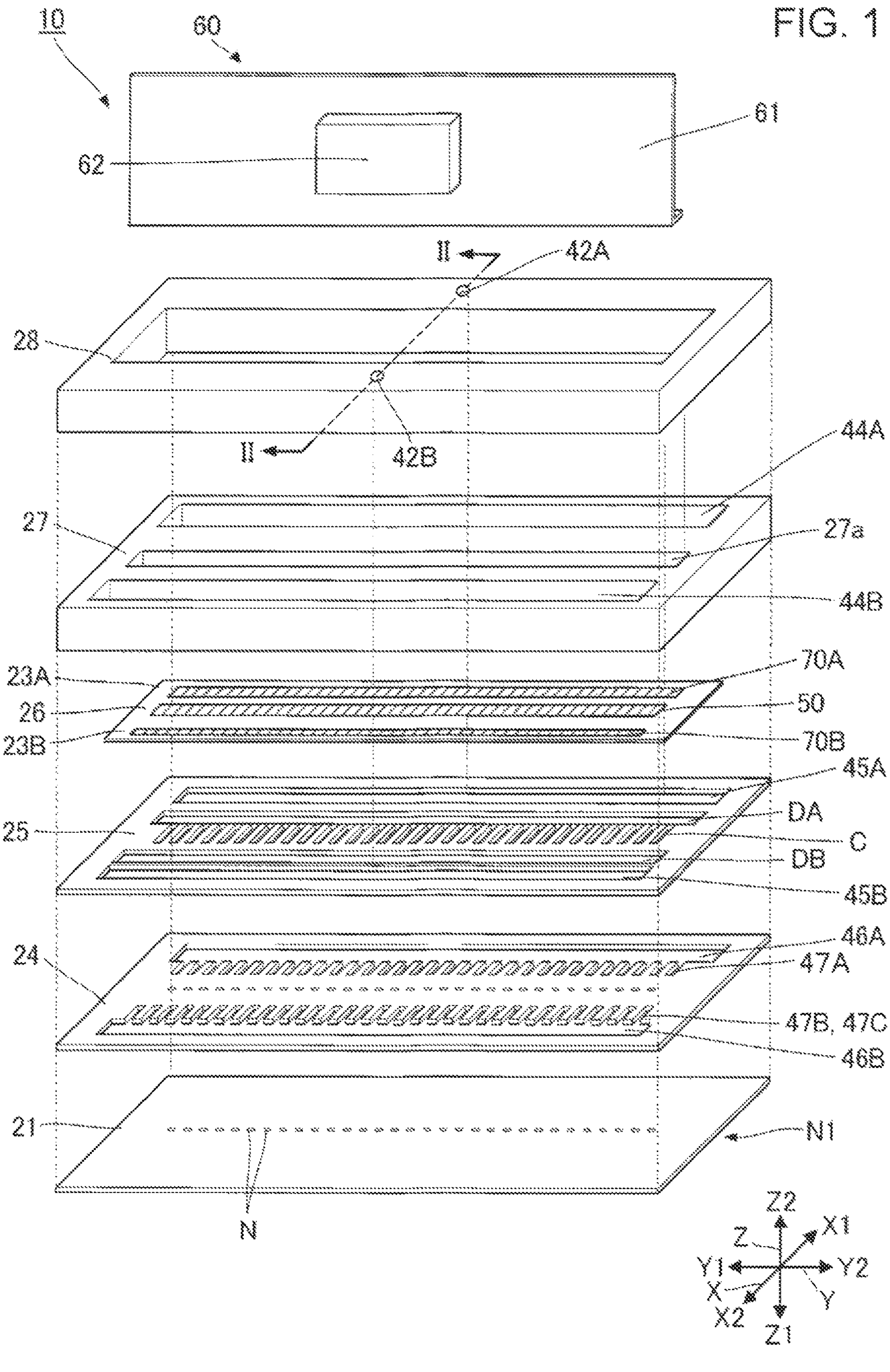
FIG. 1 is an exploded perspective view illustrating a liquid ejecting head according to Embodiment 1.
Figure 2:
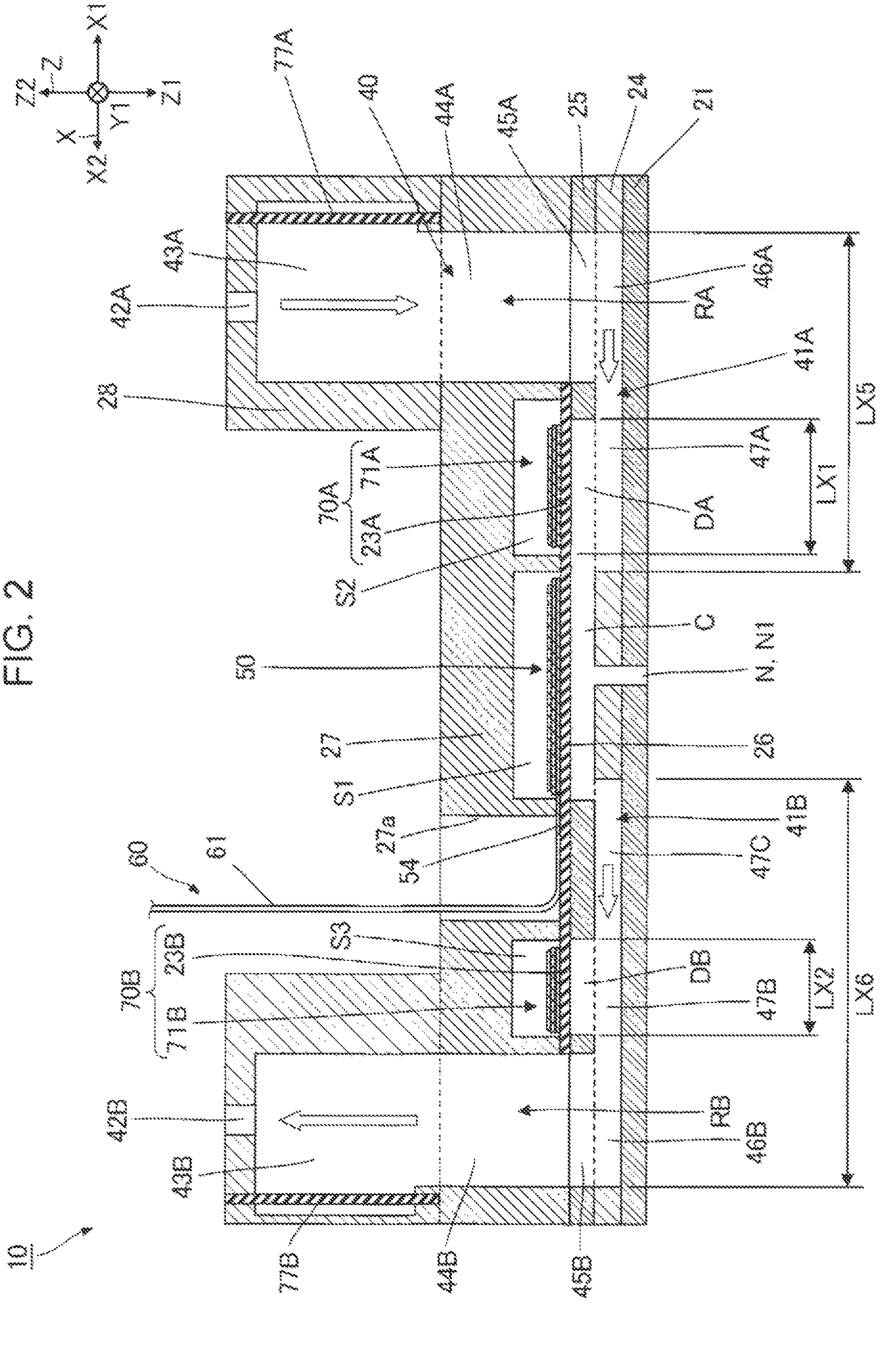
FIG. 2 is a cross-sectional view illustrating the liquid ejecting head, and is a view illustrating a cross section taken along the II-II line in FIG. 1.
Figure 3:
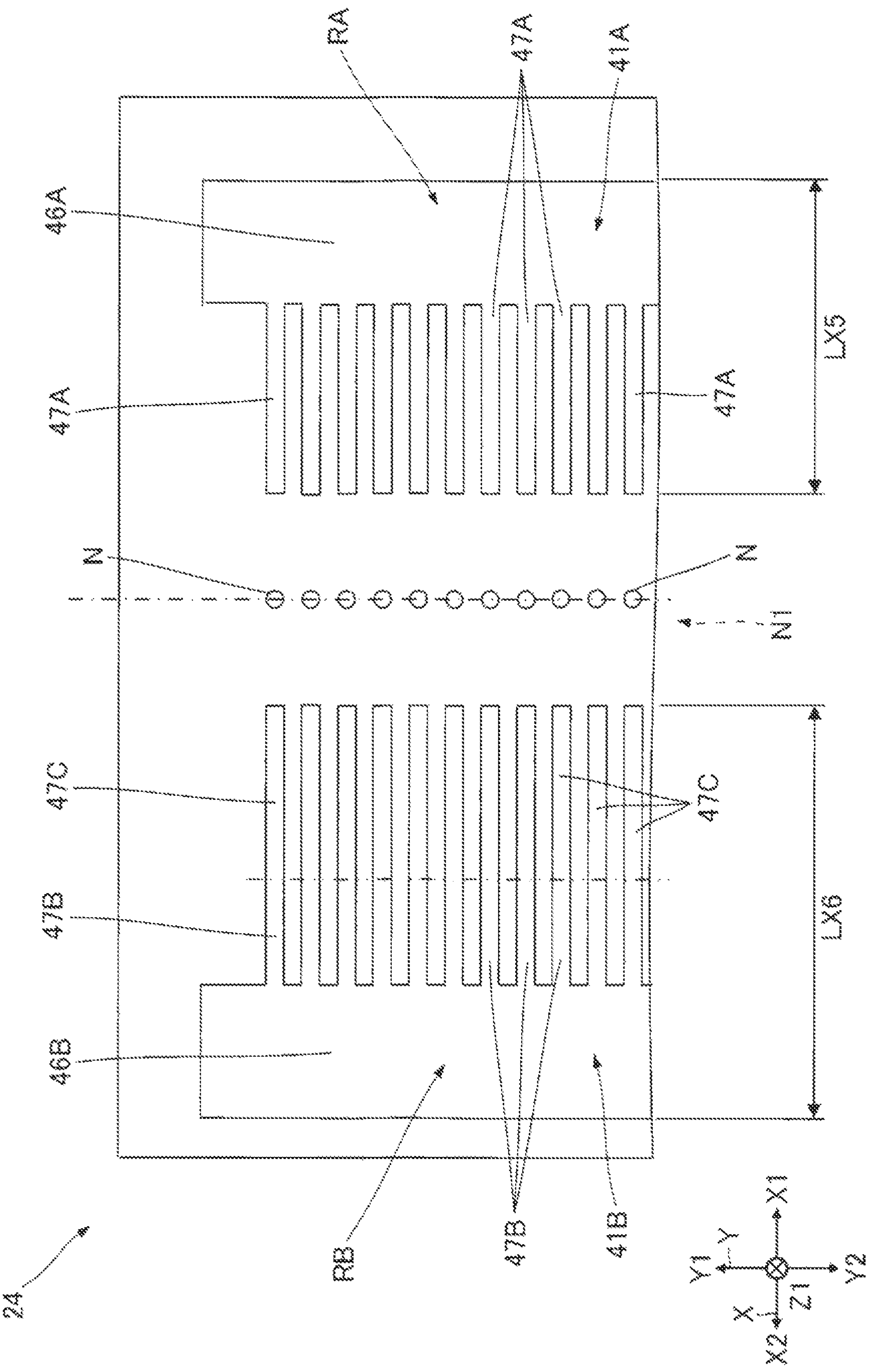
FIG. 3 is a plan view illustrating part of a communication plate according to Embodiment 1.
Figure 4:
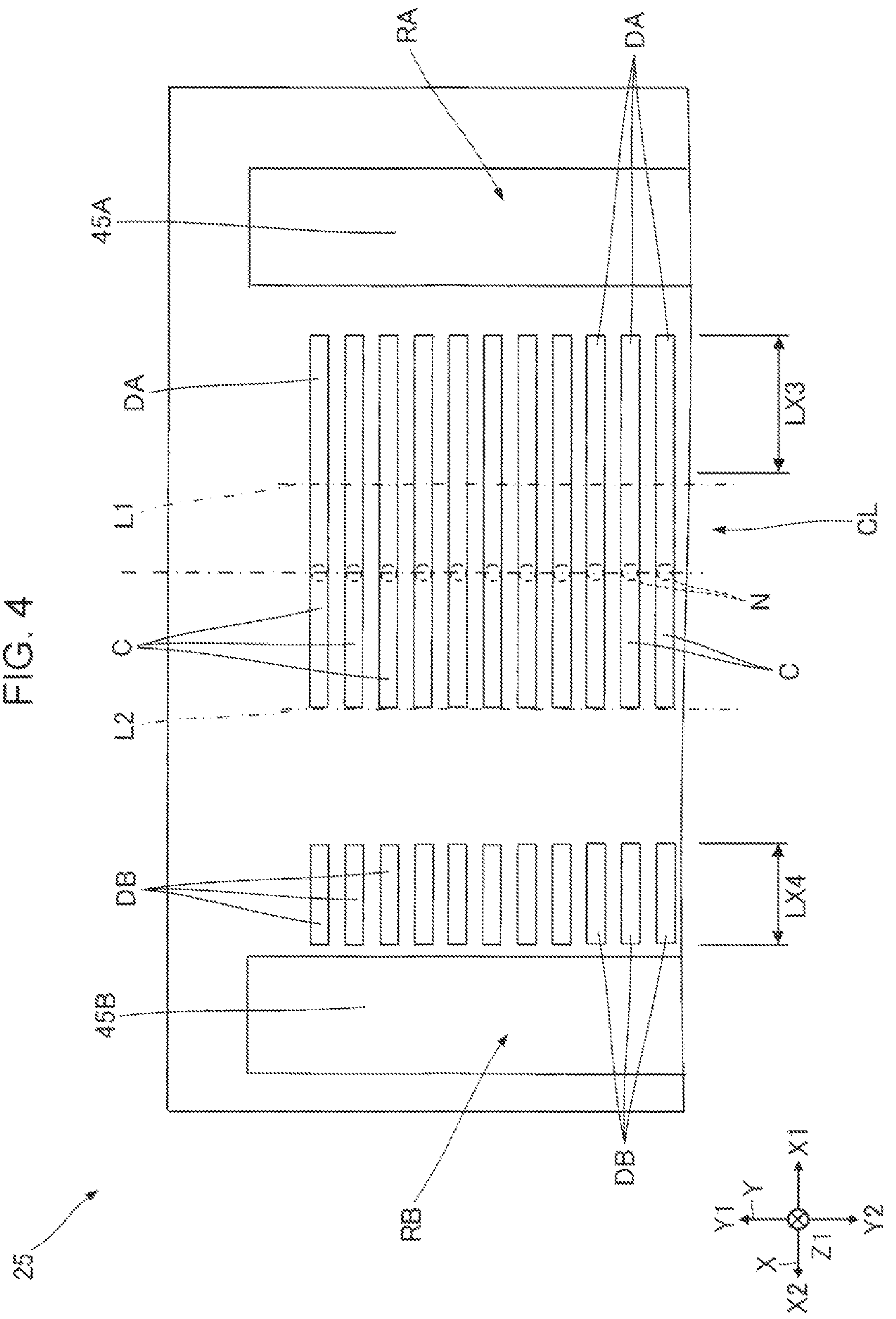
FIG. 4 is a plan view illustrating part of a pressure chamber substrate according to Embodiment 1.
Figure 5:
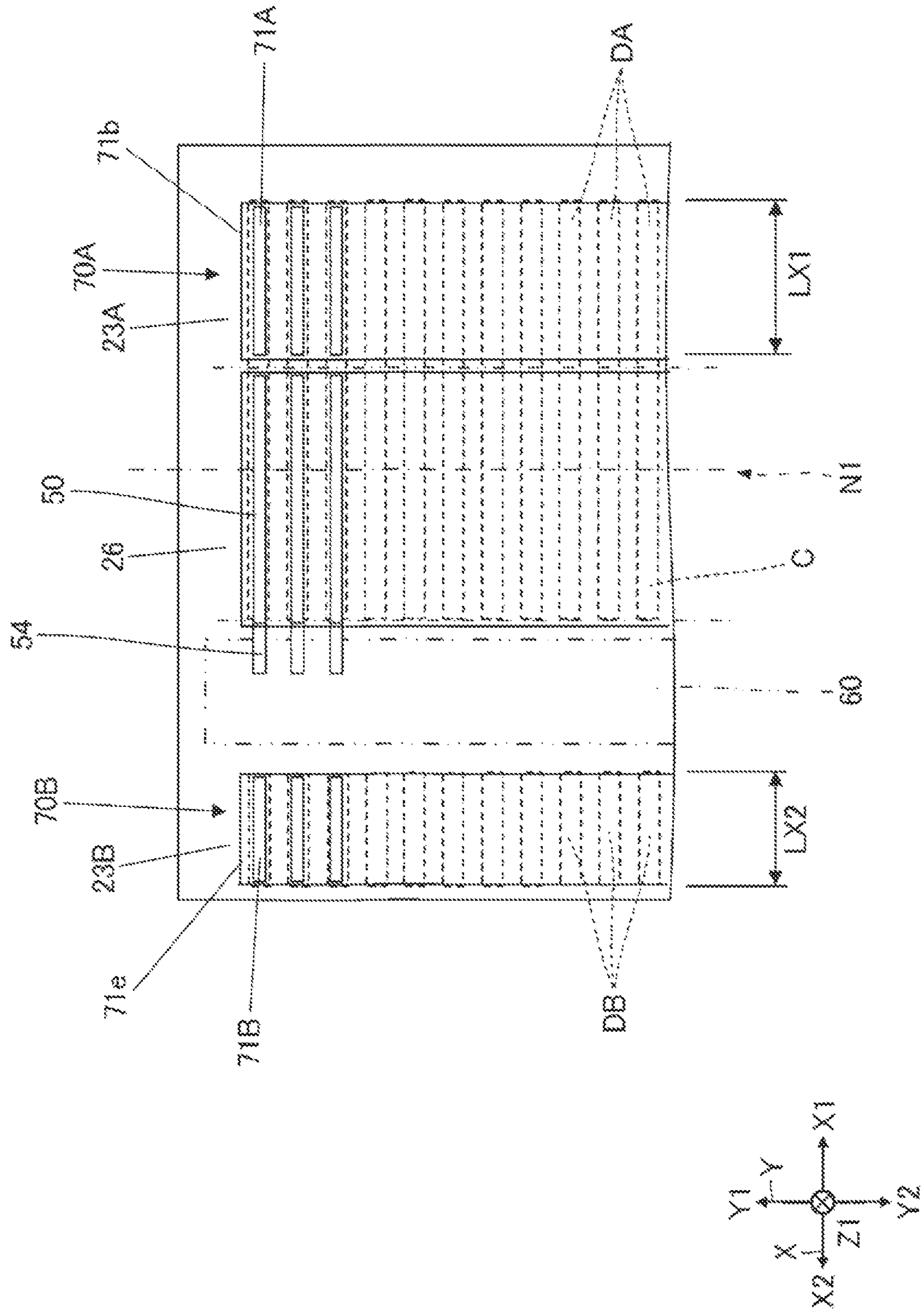
FIG. 5 is a plan view illustrating part of a vibration plate, some piezoelectric elements, and part of vibration absorbing units.

A liquid ejecting head 10 according to Embodiment 1 will be described with reference to FIGS. 1 to 8. FIG. 1 is an exploded perspective view illustrating the liquid ejecting head 10 according to Embodiment 1. FIG. 2 is a cross-sectional view illustrating the liquid ejecting head 10, and is a view illustrating a cross section taken along the II-II line in FIG. 1. FIG. 3 is a partial plan view illustrating part of a communication plate 24. FIG. 4 is a partial plan view illustrating part of a pressure chamber substrate 25 according to Embodiment 1. FIG. 5 is a plan view illustrating part of a vibration plate, some piezoelectric elements, and part of vibration absorbing units according to Embodiment 1. The liquid ejecting head 10 employs a circulation method in which a liquid having flowed through later-described common liquid chambers RA and RB and pressure chambers C is circulated.

Meanwhile, terms "supply side" and "discharge side" are sometimes used herein. "Supply side" refers to the side of a liquid flow channel upstream of the pressure chambers C. Also, things associated with the side upstream of the pressure chambers C may be referred to as "supply side". For example, as will be seen later, terms such as "supply-side compliance substrate" may be used. "Discharge side" refers to the side of a liquid flow channel downstream of the pressure chambers C. "Discharge side" does not include nozzles N to be described later. Also, things associated with the side downstream of the pressure chambers C may be referred to as "discharge side". For example, as will be seen later, terms such as "discharge-side compliance substrate" may be used.

The liquid ejecting head 10 includes a nozzle substrate 21, the communication plate 24, the pressure chamber substrate 25, a vibration plate 26, a sealing plate 27, and piezoelectric elements 50. The liquid ejecting head 10 also includes a case 28 and a COF 60. COF stands for Chip on Film. The liquid ejecting head 10 has compliance substrates 23A and 23B and damper chambers DA and DB. In the present embodiment, a liquid ejecting head 10 that ejects an ink as an example of a liquid will be described. The liquid is not limited to an ink, and the liquid ejecting head 10 is capable of ejecting other kinds of liquids.

The thickness directions of the nozzle substrate 21, the communication plate 24, the pressure chamber substrate 25, the vibration plate 26, the sealing plate 27, and the case 28 are oriented along the Z-axis direction. The nozzle substrate 21 is disposed at the bottom of the liquid ejecting head 10. The communication plate 24 is disposed on the Z2-direction side of the nozzle substrate 21. The pressure chamber substrate 25 is disposed on the Z2-direction side of the communication plate 24. In other words, the communication plate 24 is provided between the pressure chamber substrate 25 and the nozzle substrate 21. The vibration plate 26 and the compliance substrates 23A and 23B are formed on the Z2-direction side of the pressure chamber substrate 25.

The sealing plate 27 is disposed on the Z2-direction side of the vibration plate 26 and the compliance substrates 23A and 23B. The sealing plate 27 includes portions situated outward of the compliance substrates 23A and 23B in the X-axis direction. These outer portions of the sealing plate 27 in the X-axis direction are located on the Z2-direction side of the pressure chamber substrate 25. The sealing plate 27 cover the vibration plate 26, the compliance substrates 23A and 23B, the plurality of piezoelectric elements 50, and the pressure chamber substrate 25. The case 28 is disposed on the sealing plate 27. The piezoelectric elements 50 are provided respectively for the pressure chambers C.

Next, a flow channel 40 through which the ink flows will be described. In the liquid ejecting head 10, the flow channel 40, through which the ink flows, is formed. The flow channel 40 includes a supply port 42A, a discharge port 42B, the common liquid chambers RA and RB, the damper chambers DA and DB, the pressure chambers C, communication flow channels 47A to 47C, and the nozzles N.

The flow channel 40 has a supply flow channel 41A and a discharge flow channel 41B. The supply flow channel 41A is a flow channel upstream of the pressure chambers C, and is a flow channel inside the communication plate 24 and the pressure chamber substrate 25. The supply flow channel 41A includes a flow channel 45A, a communication flow channel 46A, and the damper chambers DA. The discharge flow channel 41B is a flow channel downstream of the pressure chambers C, and is a flow channel inside the communication plate 24 and the pressure chamber substrate 25. The discharge flow channel 41B includes the communication flow channels 47C, the communication flow channels 47B, the damper chambers DB, a flow channel 46B, and a flow channel 45B. The supply flow channel 41A does not include the flow channel 44A in the sealing plate 27 or a flow channel 43A in the case 28. The discharge flow channel 41B does not include a flow channel 44B in the sealing plate 27 or a flow channel 43B in the case 28.

The common liquid chamber RA is provided in common for the plurality of pressure chambers C. The common liquid chamber RA is continuous in the Y-axis direction. The common liquid chamber RA includes the flow channel 43A provided in the case 28, the flow channel 44A provided in the sealing plate 27, the flow channel 45A provided in the pressure chamber substrate 25, and the flow channel 46A provided in the communication plate 24. These flow channels 43A, 44A, 45A, and 46A are continuous with one another in the Z-axis direction. The flow channel 45A and the flow channel 46A are an example of a common supply flow channel. The flow channels 43A and 44A of the common liquid chamber RA are not included in the common supply flow channel.

The plurality of communication flow channels 47A are provided respectively for the plurality of pressure chambers C. The plurality of communication flow channels 47A are disposed downstream of the common liquid chamber RA. The communication flow channels 47A communicate with the flow channel 46A.

The plurality of damper chambers DA are provided respectively for the plurality of pressure chambers C. The plurality of damper chambers DA are provided respectively between the plurality of communication flow channels 47A and the plurality of pressure chambers C. The damper chambers DA are located on the Z2-direction side of the communication flow channels 47A. The damper chambers DA communicate with the side downstream of the communication flow channels 47A. The damper chambers DA are located on the X1-direction side of the pressure chambers C. The damper chambers DA communicate with the side upstream of the pressure chambers C. The communication flow channels 47A and the damper chambers DA are an example of "individual supply flow channels". The damper chambers DA are supply-side damper chambers.

The plurality of nozzles N communicate with the plurality of pressure chambers C, respectively. The nozzles N are located on the Z1-direction side of the pressure chambers C.

The plurality of communication flow channels 47C are provided respectively for the plurality of pressure chambers C. The plurality of communication flow channels 47C communicate with the side downstream of the pressure chambers C. End portions of the pressure chambers C in the X2 direction, which are downstream end portions, and end portions of the communication flow channels 47C in the X1 direction, which are upstream end portions, overlap each other as viewed from the Z-axis direction.

The plurality of communication flow channels 47B are provided respectively for the plurality of communication flow channels 47C. The communication flow channels 47B are disposed downstream of the communication flow channels 47C.

The plurality of damper chambers DB are provided respectively for the plurality of pressure chambers C. The damper chambers DB are located on the Z2-direction side of the communication flow channels 47B. The plurality of damper chambers DB communicate respectively with the plurality of communication flow channels 47B. The damper chambers DB communicate with the pressure chambers C through the communication flow channels 47B and 47C. The communication flow channels 47B and 47C and the damper chambers DB are an example of "individual discharge flow channels". The damper chambers DB are discharge-side damper chambers.

The common liquid chamber RB is provided in common for the plurality of pressure chambers C. The common liquid chamber RB communicates in common with the plurality of communication flow channels 47B. The common liquid chamber RB communicates with the pressure chambers C through the communication flow channels 47B and 47C. The common liquid chamber RB is disposed downstream of the communication flow channels 47B.

The common liquid chamber RB is continuous in the Y-axis direction. The common liquid chamber RB includes the flow channel 43B provided in the case 28, the flow channel 44B provided in the sealing plate 27, the flow channel 45B provided in the pressure chamber substrate 25, and the flow channel 46B provided in the communication plate 24. These flow channels 43B, 44B, 45B, and 46B are continuous with one another in the Z-axis direction. The flow channel 45B and the flow channel 46B are an example of a common discharge flow channel. The flow channels 43B and 44B of the common liquid chamber RB are not included in the common discharge flow channel.

Figure 20:
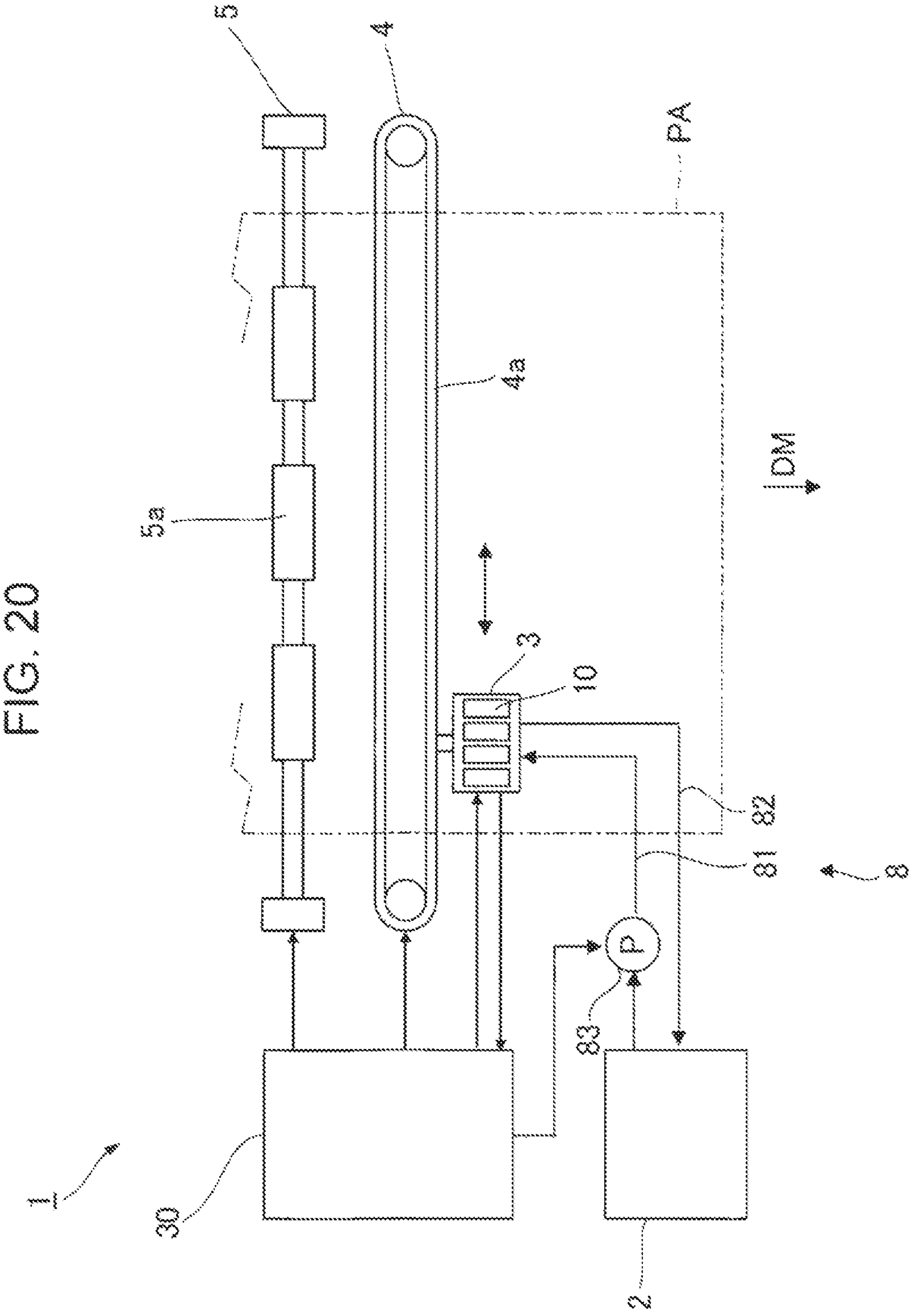
FIG. 20 is a schematic diagram illustrating a liquid ejecting apparatus according to an embodiment.

As mentioned above, the liquid ejecting head 10 employs a circulation method in which the ink having flowed through the pressure chambers C is circulated. As illustrated in FIG. 20, a circulating mechanism 8 that circulates the ink is coupled to the liquid ejecting head 10. A liquid container 2 is coupled to the circulating mechanism 8. The circulating mechanism 8 includes a supply flow channel 81 through which the ink is supplied to the liquid ejecting head 10, a collection flow channel 82 through which the ink discharged from the liquid ejecting head 10 is collected, and a pump 83 which sends the ink. The supply flow channel 81 and the collection flow channel 82 may be flow channels inside tubes, for example. The supply flow channel 81 and the collection flow channel 82 include flow channels formed by openings, grooves, recesses, etc.

The ink in the liquid container 2 is sent by the pump 83 to flow through the supply flow channel 81 and pass through the supply port 42A illustrated in FIG. 2 to thereby flow into the common liquid chamber RA. The ink in the common liquid chamber RA passes through the communication flow channels 47A and the damper chambers DA to thereby be supplied to the pressure chambers C. Part of the ink in the pressure chambers C is ejected from the nozzles N.

The ink not ejected from the nozzles N passes through the communication flow channels 47C and the communication flow channels 47B to thereby flow into the common liquid chamber RB. Part of the ink having flowed through the communication flow channels 47C flows into the damper chambers DB. The ink in the common liquid chamber RB flows into the collection flow channel 82 through the discharge port 42B and is collected into the liquid container 2. The ink is circulated through the liquid ejecting head 10 in this manner.

Next, a structure of the liquid ejecting head 10 will be described. In the nozzle substrate 21 illustrated in FIGS. 1 and 2, the plurality of nozzles N are formed. The plurality of nozzles N form a nozzle array N1. The nozzle array N1 includes the plurality of nozzles N arrayed in the Y-axis direction. The nozzles N are through-holes penetrating through the nozzle substrate 21 in the Z-axis direction.

As illustrated in FIGS. 2 and 3, in the communication plate 24, there are formed the flow channel 46A, which is a part of the common liquid chamber RA, the communication flow channels 47A, the communication flow channels 47C, the communication flow channels 47B, and the flow channel 46B, which is a part of the common liquid chamber RB. That is, part of the supply flow channels and part of the discharge flow channel are provided in the communication plate 24. Through-holes, grooves, recesses, and the like are formed in the communication plate 24. These through-holes, grooves, recesses, and the like form part of the common liquid chambers RA and RB and the communication flow channels 47A, 47B, and 47C.

Part of the plurality of nozzles N is formed in the communication plate 24. As illustrated in FIG. 2, the nozzles N penetrate through the communication plate 24 and the nozzle substrate 21 in the Z-axis direction. In the communication plate 24, portions of the nozzles N closer to the pressure chambers C are formed.

As illustrated in FIGS. 2 and 4, in the pressure chamber substrate 25, there are formed the flow channel 45A, which is a part of the common liquid chamber RA, the plurality of damper chambers DA, the plurality of pressure chambers C, the plurality of damper chambers DB, and the flow channel 45B, which is a part of the common liquid chamber RB. The plurality of nozzles N are illustrated with dashed lines in FIG. 4. The pressure chamber substrate 25 can be manufactured from a single-crystal substrate of silicon, for example. The pressure chamber substrate 25 may be manufactured from another material.

As illustrated in FIG. 4, the plurality of damper chambers DA extend in the X-axis direction. The damper chambers DA and the common liquid chamber RA are separated from each other in the X-axis direction. The damper chambers DA and the pressure chambers C are formed as common spaces continuous with each other in the X-axis direction. The damper chambers DA penetrate through the pressure chamber substrate 25 in the Z-axis direction. The damper chambers DA each have a predetermined volume. The plurality of damper chambers DA are disposed at predetermined intervals in the Y-axis direction. Incidentally, link flow channels may be formed between the damper chambers DA and the pressure chambers C.

The pressure chambers C extend in the X-axis direction. The pressure chambers C penetrate through the pressure chamber substrate 25 in the Z-axis direction. The pressure chambers C each have a predetermined volume. The plurality of pressure chambers C are disposed at predetermined intervals in the Y-axis direction. The plurality of pressure chambers C are disposed at the same positions as the plurality of damper chambers DA in the Y-axis direction. The plurality of pressure chambers C form a pressure chamber array CL arrayed in the Y-axis direction. The pressure chamber array CL includes the plurality of pressure chambers C. The long dashed double-short dashed lines in FIG. 4 are phantom lines L1 and L2 indicating boundaries of the pressure chambers C. The phantom line L1 indicates the ends of the pressure chambers C in the X1 direction. The phantom line L2 indicates the ends of the pressure chambers C in the X2 direction.

The plurality of damper chambers DB extend in the X-axis direction. The damper chambers DB and the pressure chambers C are separated from each other in the X-axis direction. As illustrated in FIG. 2, the communication flow channels 47C are formed between the damper chambers DB and the pressure chambers C. The damper chambers DB and the common liquid chamber RB are separated from each other in the X-axis direction. The damper chambers DB are formed so as to overlap the communication flow channels 47B as viewed from the Z-axis direction. The damper chambers DB penetrate through the pressure chamber substrate 25 in the Z-axis direction. The damper chambers DB and the communication flow channels 47B communicate with each other in the Z-axis direction. The damper chambers DB each have a predetermined volume. The plurality of damper chambers DB are disposed at predetermined intervals in the Y-axis direction.

As illustrated in FIG. 4, a width LX3 of the supply-side damper chambers DA in the X-axis direction is different from a length LX4 of the discharge-side damper chambers DB in the X-axis direction. The length LX3 of the supply-side damper chambers DA in the X-axis direction is longer than the length LX4 of the discharge-side damper chambers DB in the X-axis direction. The width of the damper chambers DA in the Y-axis direction is equal to the width of the damper chambers DB in the Y-axis direction.

Figure 6:
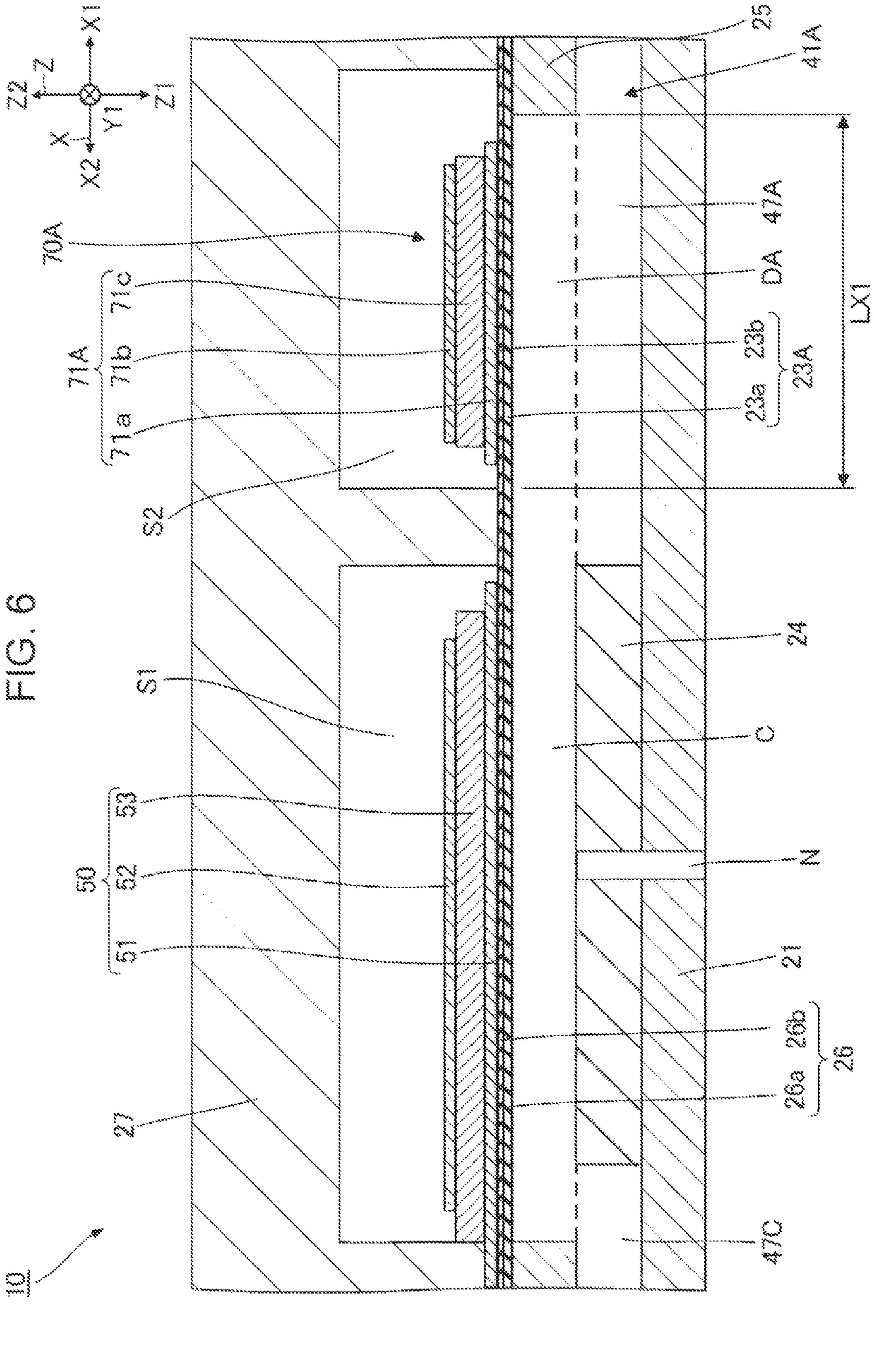
FIG. 6 is a cross-sectional view illustrating a cross section taken along the VI-VI line in FIG. 5, and is a view illustrating the supply-side vibration absorbing unit.
Figure 7:
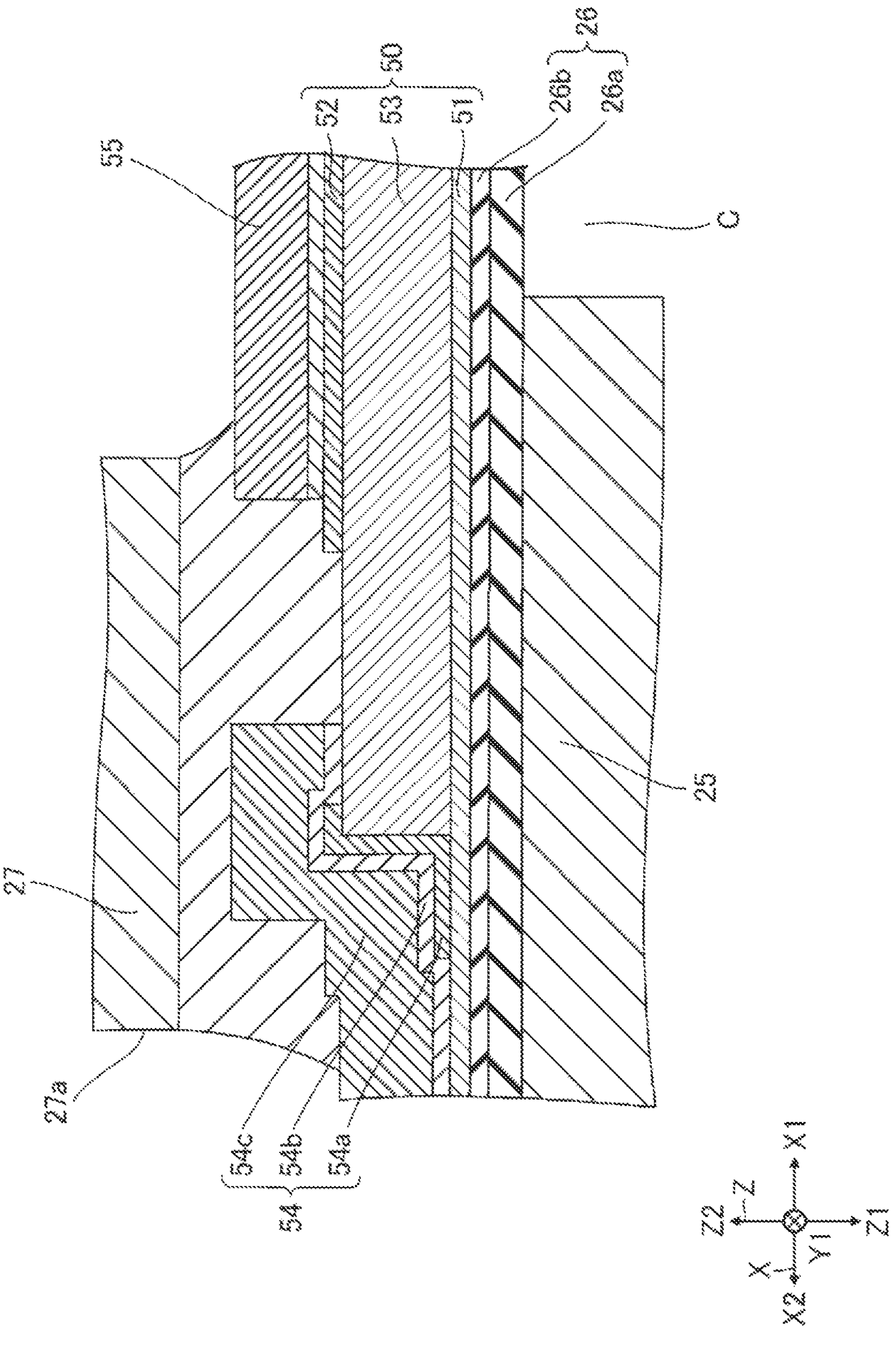
FIG. 7 is a cross-sectional view illustrating part of the vibration plate and a piezoelectric element according to Embodiment 1.

FIG. 6 is a cross-sectional view illustrating a cross section taken along the VI-VI line in FIG. 5. FIG. 7 is an enlarged cross-sectional view of part of the vibration plate 26, a piezoelectric element 50, and a COM wiring 54. As illustrated in FIGS. 6 and 7, the vibration plate 26 is disposed on the upper surface of the pressure chamber substrate 25. The vibration plate 26 covers openings in the pressure chamber substrate 25. The portion of the vibration plate 26 covering the openings in the pressure chamber substrate 25 forms the upper wall surfaces of the pressure chambers C.

The vibration plate 26 includes an elastic layer 26*a* and an insulating layer 26*b*. The elastic layer 26*a* is made of silicon dioxide ($SiO_2$), for example. The insulating layer 26*b* is made of zirconium dioxide ($ZrO_2$), for example. The elastic layer 26*a* is formed on the pressure chamber substrate 25, and the insulating layer 26*b* is formed on the elastic layer 26*a*.

As illustrated in FIGS. 5 to 7, the plurality of piezoelectric elements 50 are formed on the vibration plate 26. The piezoelectric elements 50 are disposed at positions overlapping the pressure chambers C as viewed from the Z-axis direction. The piezoelectric elements 50 are provided respectively for the plurality of pressure chambers C.

The vibration plate 26 vibrates in the Z-axis direction by being driven by the piezoelectric elements 50. The portions of the vibration plate 26 forming the upper wall surfaces of the pressure chambers C are driven by the piezoelectric elements 50 above the pressure chambers C. The total thickness of the vibration plate 26 is 2 μm or less, for example. The total thickness of the vibration plate 26 may be 15 μm or less, 40 μm or less, or 100 μm or less. When the total thickness of the vibration plate 26 is, for example, 15 μm or less, it may include a resin layer. The vibration plate 26 may be formed from a metal. Examples of the metal include stainless steel, nickel, and so on. When the vibration plate 26 is formed from such a metal, the plate thickness of the vibration plate 26 may be 15 μm or more and 100 μm or less.

The piezoelectric element 50 illustrated in FIGS. 6 and 7 has an individual electrode 51, a common electrode 52, and a piezoelectric layer 53. The individual electrode 51, the piezoelectric layer 53, and the common electrode 52 are laminated in this order on the vibration plate 26. The piezoelectric layer 53 is sandwiched between the individual electrode 51 and the common electrode 52. The individual electrode 51 has an elongated shape along the X-axis direction. A plurality of the individual electrodes 51 are arrayed with a gap given therebetween in the Y-axis direction. The plurality of individual electrodes 51 are disposed respectively for the plurality of pressure chambers C. The individual electrodes 51 are disposed respectively at positions overlapping the plurality of pressure chambers C as viewed from the Z-axis direction. The common electrode 52 has a strip shape and extends in the Y-axis direction. The common electrode 52 is so continuous as to cover the plurality of individual electrodes 51.

The individual electrodes 51 each include a foundation layer and an electrode layer. The foundation layer contains titanium (Ti), for example. The electrode layer contains an electrically conductive material with low resistance, such as platinum (Pt) or iridium (Ir), for example. This electrode layer may be formed of an oxide such as strontium ruthenate ($SrRuO_3$) or lanthanum nickelate ($LaNiO_3$), for example. The piezoelectric layer 53 is formed of a publicly known piezoelectric material such as lead zirconate titanate ($Pb(Zr,Ti)O_3$) or a ceramic, for example.

The common electrode 52 includes a foundation layer and an electrode layer. The foundation layer contains titanium, for example. The electrode layer contains an electrically conductive material with low resistance, such as platinum or iridium, for example. This electrode layer may be formed of an oxide such as strontium ruthenate or lanthanum nickelate, for example. The regions of the piezoelectric layer 53 between the individual electrodes 51 and the common electrode 52 serve as driving regions. The driving regions are formed respectively above the plurality of pressure chambers C.

A predetermined reference voltage is applied to the common electrode 52. The reference voltage is a constant voltage and is set to be a voltage higher than a ground voltage, for example. A retention signal with a constant voltage, for example, is applied to the common electrode 52. A driving signal with a variable voltage is applied to each individual electrode 51. A voltage corresponding to the difference between the reference voltage applied to the common electrode 52 and the driving signal supplied to the individual electrode 51 is applied to the piezoelectric layer 53. The driving signal corresponds to the ejection amount of the liquid to be ejected from the nozzle N.

Applying a voltage between the individual electrode 51 and the common electrode 52 deforms the piezoelectric layer 53. As a result, the piezoelectric element 50 generates an energy that flexurally deforms the vibration plate 26.

The energy generated by the piezoelectric element 50 vibrates the vibration plate 26, so that the pressure on the liquid inside the pressure chamber C changes and the liquid inside the pressure chamber C gets ejected from the nozzle N.

As illustrated in FIGS. 1 and 2, the COF 60 includes a flexible wiring substrate 61 and a driving circuit 62. The flexible wiring substrate 61 is a wiring substrate having flexibility. The flexible wiring substrate 61 is an FPC, for example. The flexible wiring substrate 61 may be an FFC, for example. FPC stands for Flexible Printed Circuit. FFC stands for Flexible Flat Cable.

As illustrated in FIG. 2, the flexible wiring substrate 61 is electrically coupled to the individual electrode 51 of each piezoelectric element 50 via the COM wiring 54 to be described later. The COM wiring 54 is illustrated in FIGS. 2, 5, and 7.

Also, the flexible wiring substrate 61 is electrically coupled to the common electrode 52 of the piezoelectric elements 50 via a VBS wiring 55 to be described later. The flexible wiring substrate 61 is electrically coupled to a circuit substrate not illustrated. The circuit substrate includes a driving signal generating circuit 32 illustrated in FIG. 21.

The driving circuit 62 is mounted on the flexible wiring substrate 61. The driving circuit 62 includes a switching element for driving the piezoelectric elements 50. The driving circuit 62 is electrically coupled to a control unit 30 illustrated in FIG. 21 through the flexible wiring substrate 61 and the circuit substrate. The driving circuit 62 receives a driving signal Com output from the driving signal generating circuit 32. The switching element of the driving circuit 62 switches to supplying or not supplying the driving signal Com generated by the driving signal generating circuit 32 to the piezoelectric elements 50. The driving circuit 62 supplies a driving voltage or current to the piezoelectric elements 50 to thereby vibrate the vibration plate 26.

As illustrated in FIGS. 5 and 7, the liquid ejecting head 10 includes the COM wirings 54. The plurality of COM wirings 54 are coupled respectively to the plurality of individual electrodes 51. The plurality of COM wirings 54 run in the X-axis direction and are extended to the inside of an opening portion 27*a* of the sealing plate 27. The opening portion 27*a* is illustrated in FIGS. 1 and 2. Illustration of the COM wirings 54 is omitted in FIG. 1. The opening portion 27*a* penetrates through the sealing plate 27 in the Z-axis direction. The COM wirings 54 are electrically coupled to the COF 60 at a position corresponding to the opening portion 27*a* as viewed from the Z-axis direction. The COM wirings 54 are formed of an electrically conductive material lower in resistance than the individual electrodes 51. For example, the COM wirings 54 are electrically conductive patterns with a structure including an electrically conductive film formed of nichrome (NiCr) and an electrically conductive film of gold (Au) laminated on its surface.

As illustrated in FIG. 7, the COM wirings 54 each have an electrode layer 54*a*, a first adhesion layer 54*b*, and a first wiring layer 54*c*. The electrode layer 54*a* covers the end surface of the piezoelectric layer 53 in the X2 direction. The end surface in the X2 direction is a surface crossing the X-axis direction. The first adhesion layer 54*b* covers the electrode layer 54*a* and the individual electrode 51. The first adhesion layer 54*b* adheres to the electrode layer 54*a* and the individual electrode 51. The first wiring layer 54*c* covers the first adhesion layer 54*b*. The first wiring layer 54*c* is electrically coupled to the individual electrode 51 through the first adhesion layer 54*b*.

The liquid ejecting head 10 includes the VBS wiring 55 electrically coupled to the COF 60 and the common electrode 52. The VBS wiring 55 is disposed on the common electrode 52 and extends in the Y-axis direction. The VBS wiring has a strip shape as viewed from the Z-axis direction and is formed so as to cover the common electrode 52. The VBS wiring 55 is electrically coupled to the COF 60 at an end portion of the liquid ejecting head 10 in the Y-axis direction.

Figure 8:
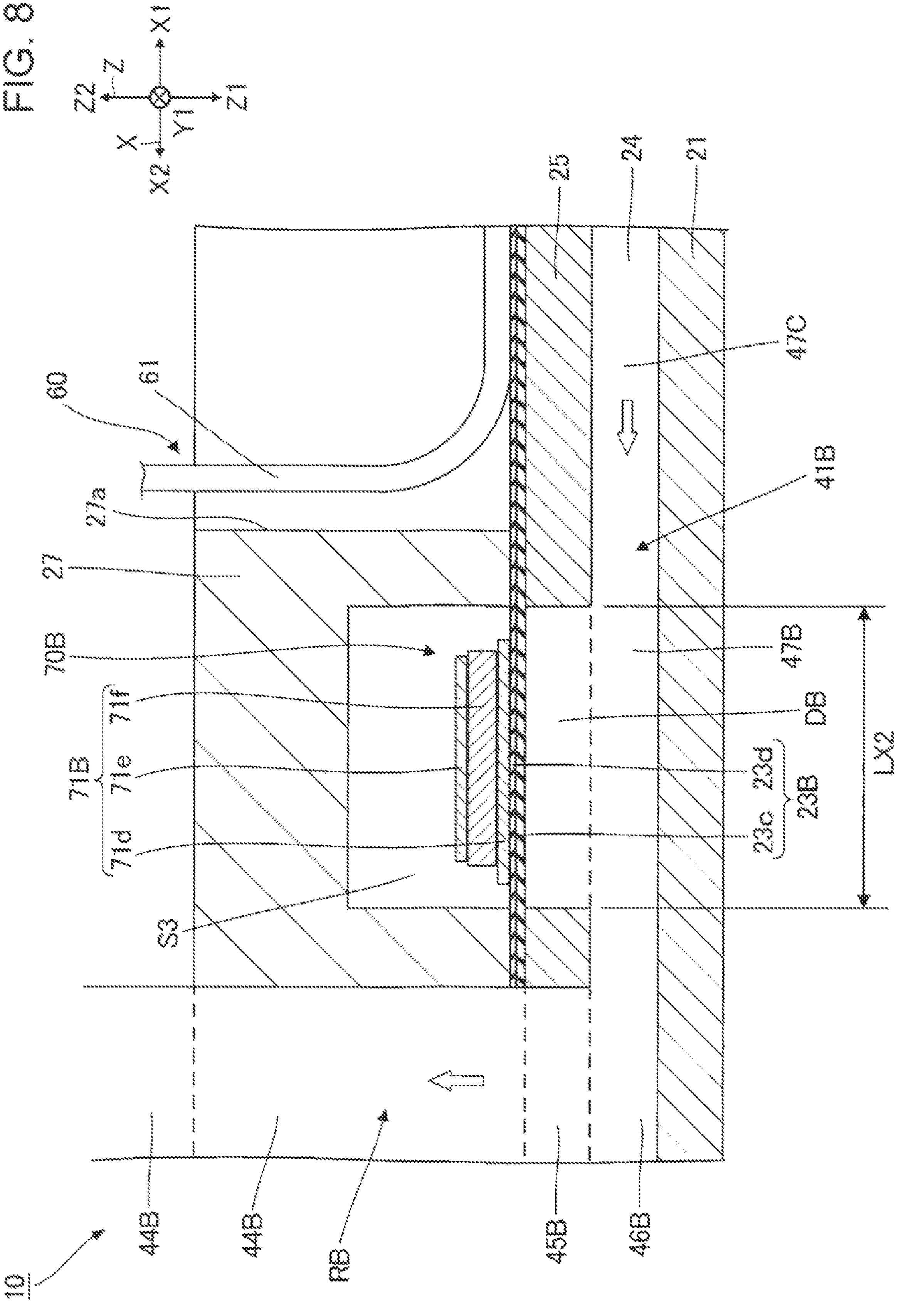
FIG. 8 is a cross-sectional view illustrating a cross section taken along the VIII-VIII line in FIG. 5, and is a view illustrating the discharge-side vibration absorbing unit.

Next, vibration absorbing units 70A and 70B will be described with reference to FIGS. 2, 5, 6, and 8. The liquid ejecting head 10 includes a supply-side vibration absorbing unit 70A and a discharge-side vibration absorbing unit 70B. As illustrated in FIGS. 2, 5, and 6, the supply-side vibration absorbing unit 70A is provided for the supply-side damper chambers DA. As illustrated in FIGS. 2, 5, and 8, the discharge-side vibration absorbing unit 70B is provided for the discharge-side damper chambers DB.

As illustrated in FIG. 6, the vibration absorbing unit 70A includes compliance substrates 23A and piezoelectric elements 71A. The compliance substrates 23A are located on the X1-direction side of the vibration plate 26. The compliance substrates 23A are disposed on the upper surface of the pressure chamber substrate 25. The compliance substrates 23A cover the portions of the openings in the pressure chamber substrate 25 corresponding to the damper chambers DA. The compliance substrates 23A form the upper wall surfaces of the damper chambers DA. As viewed from the Z-axis direction, the compliance substrates 23A are disposed at positions corresponding to a sealing space S2 formed in the sealing plate 27.

The compliance substrates 23A each include a flexible film. The compliance substrates 23A each include an elastic layer 23*a* and an insulating layer 23*b*. The elastic layer 23*a* is made of silicon dioxide ($SiO_2$), for example. The insulating layer 23*b* is made of zirconium dioxide ($ZrO_2$), for example. The elastic layer 23*a* is formed on the pressure chamber substrate 25, and the insulating layer 23*b* is formed on the elastic layer 23*a*. The elastic layer 23*a* is formed so as to be continuous with the elastic layer 26*a* of the vibration plate 26 covering the pressure chambers C. The insulating layer 23*b* is formed so as to be continuous with the insulating layer 26*b* of the vibration plate 26.

The plurality of compliance substrates 23A are provided respectively for the plurality of damper chambers DA arrayed in the Y-axis direction. The compliance substrates 23A are deformable under a pressure from the ink. The compliance substrates 23A can absorb variations in the pressure on the ink in the damper chambers DA by deforming under the pressure from the ink. The plurality of compliance substrates 23A individually deform for the plurality of damper chambers DA.

As illustrated in FIGS. 5 and 6, the plurality of piezoelectric elements 71A are formed on the compliance substrates 23A. The piezoelectric elements 71A are disposed at positions overlapping the damper chambers DA as viewed from the Z-axis direction. The piezoelectric elements 71A are provided respectively for the plurality of damper chambers DA.

The piezoelectric elements 71A each have an individual electrode layer 71*a*, a common electrode layer 71*b*, and a piezoelectric layer 71*c*. The individual electrode layer 71*a*, the common electrode layer 71*b*, and the piezoelectric layer 71*c* are laminated in this order on the compliance substrate 23A. The piezoelectric layer 71*c* is sandwiched between the individual electrode layer 71*a* and the common electrode layer 71*b*. The individual electrode layer 71*a* has an elongated shape along the X-axis direction. A plurality of the individual electrode layers 71*a* are arrayed with a gap given therebetween in the Y-axis direction. The plurality of individual electrode layers 71*a* are disposed respectively for the plurality of damper chambers DA. The individual electrode layers 71*a* are disposed respectively at positions overlapping the plurality of damper chambers DA as viewed from the Z-axis direction. The common electrode layer 71*b* has a strip shape and extends in the Y-axis direction. The common electrode layer 71*b* is so continuous as to cover the plurality of individual electrode layers 71*a*.

The structure and material of each individual electrode layer 71*a* are similar to those of the individual electrode 51 of each piezoelectric element 50. The structure and material of the common electrode layer 71*b* are similar to those of the common electrode 52 of the piezoelectric element 50. The structure and material of the piezoelectric layer 71*c* are similar to those of the piezoelectric layer 53 of the piezoelectric element 50. The piezoelectric element 71A can be formed in the film form similarly to the piezoelectric element 50.

As illustrated in FIGS. 2 and 5, the compliance substrates 23B are located on the X2-direction side of the vibration plate 26. The compliance substrates 23B are located on the opposite side of the vibration plate 26 from the compliance substrates 23A in the X-axis direction. As illustrated in FIG. 8, the compliance substrates 23B are disposed on the upper surface of the pressure chamber substrate 25. The compliance substrates 23B cover the portions of the openings in the pressure chamber substrate 25 corresponding to the damper chambers DB. The compliance substrates 23B form the upper wall surfaces of the damper chambers DB. As viewed from the Z-axis direction, the compliance substrates 23B are disposed at positions corresponding to a sealing space S3 formed in the sealing plate 27.

The compliance substrates 23B each include a flexible film. The compliance substrates 23B each include an elastic layer 23*c* and an insulating layer 23*d*. The elastic layer 23*c* is made of silicon dioxide ($SiO_2$), for example. The insulating layer 23*d* is made of zirconium dioxide ($ZrO_2$), for example. The elastic layer 23*c* is formed on the pressure chamber substrate 25, and the insulating layer 23*d* is formed on the elastic layer 23*c*. The elastic layer 23*c* is formed so as to be continuous with the elastic layer 26*a* of the vibration plate 26. The insulating layer 23*d* is formed so as to be continuous with the insulating layer 26*b* of the vibration plate 26.

The plurality of compliance substrates 23B are provided respectively for the plurality of damper chambers DB arrayed in the Y-axis direction. The compliance substrates 23B are deformable under a pressure from the ink. The compliance substrates 23B can absorb variations in the pressure on the ink in the damper chambers DB by deforming under the pressure from the ink. The plurality of compliance substrates 23B individually deform for the plurality of damper chambers DB.

As illustrated in FIGS. 5 and 8, a plurality of piezoelectric elements 71B are formed on the compliance substrates 23B. The piezoelectric elements 71B are disposed at positions overlapping the damper chambers DB as viewed from the Z-axis direction. The piezoelectric elements 71B are provided respectively for the plurality of damper chambers DB.

The piezoelectric elements 71B each have an individual electrode layer 71*d*, a common electrode layer 71*e*, and a piezoelectric layer 71*f*. The individual electrode layer 71*d*, the common electrode layer 71*e*, and the piezoelectric layer 71*f* are laminated in this order on the compliance substrate 23B. The piezoelectric layer 71*f* is sandwiched between the individual electrode layer 71*d* and the common electrode layer 71*e*. The individual electrode layer 71*d* has an elongated shape along the X-axis direction. A plurality of the individual electrode layers 71*d* are arrayed with a gap given therebetween in the Y-axis direction. The plurality of individual electrode layers 71*d* are disposed respectively for the plurality of damper chambers DB. The individual electrode layers 71*d* are disposed respectively at positions overlapping the plurality of damper chambers DB as viewed from the Z-axis direction. The common electrode layer 71*e* has a strip shape and extends in the Y-axis direction. The common electrode layer 71*e* is so continuous as to cover the plurality of individual electrode layers 71*d*.

The structure and material of each individual electrode layer 71*d* are similar to those of the individual electrode 51 of each piezoelectric element 50. The structure and material of the common electrode layer 71*e* are similar to those of the common electrode 52 of the piezoelectric element 50. The structure and material of the piezoelectric layer 71*f* are similar to those of the piezoelectric layer 53 of the piezoelectric element 50. The piezoelectric element 71B can be formed in the film form similarly to the piezoelectric elements 50 and 71A.

The sealing plate 27 has a rectangular shape as viewed from the Z-axis direction. The sealing plate 27 protects the plurality of piezoelectric elements 50, 71A, and 71B and also reinforces the mechanical strength of the pressure chamber substrate 25, the vibration plate 26, and the compliance substrates 23A and 23B. The sealing plate 27 is bonded to the vibration plate 26 with an adhesive, for example. The sealing plate 27 is fixed to the pressure chamber substrate 25 via the vibration plate 26 and the compliance substrates 23A and 23B.

The sealing spaces S1 to S3 are formed in the sealing plate 27. Recesses are formed in the lower surface of the sealing plate 27. The spaces formed by these recesses are the sealing spaces S1 to S3. The sealing spaces S1 to S3 are each formed so as to be continuous in the Y-axis direction. The sealing space S1 is formed so as to overlap the plurality of pressure chambers C as viewed from the Z-axis direction. The sealing space S1 houses the plurality of piezoelectric elements 50. The sealing space S2 is formed so as to overlap the plurality of damper chambers DA as viewed from the Z-axis direction. The sealing space S2 houses the plurality of piezoelectric elements 71A. The sealing space S3 is formed so as to overlap the plurality of damper chambers DB as viewed from the Z-axis direction. The sealing space S3 houses the plurality of piezoelectric elements 71B.

In the sealing plate 27, there are formed the flow channel 44A included in the common liquid chamber RA and the flow channel 44B included in the common liquid chamber RB. The flow channels 44A and 44B are formed so as to penetrate through the sealing plate 27 in the Z-axis direction. The flow channel 44A is located on the X1-direction side of the sealing space S2. The flow channel 44B is located on the X2-direction side of the sealing space S3.

The case 28 is located on the Z2-direction side of the sealing plate 27. In the case 28, the supply port 42A, the discharge port 42B, and the flow channels 43A and 43B are formed. The flow channel 43A is included in the common liquid chamber RA. The flow channel 43A is formed so as to overlap the flow channel 44A in the sealing plate 27 as viewed from the Z-axis direction. The supply port 42A communicates with the flow channel 43A. The flow channel 43B is included in the common liquid chamber RB. The flow channel 43B is formed so as to overlap the flow channel 44B in the sealing plate 27 as viewed from the Z-axis direction. The discharge port 42B communicates with the flow channel 43B.

Next, compliance substrates 77A and 77B provided in the common liquid chambers RA and RB will be described with reference to FIG. 2. As illustrated in FIG. 2, the liquid ejecting head 10 includes the compliance substrates 77A and 77B. The compliance substrates 77A and 77B are different from the compliance substrates 23A and 23B provided respectively for the damper chambers DA and DB. In FIG. 2, the configuration of the compliance substrates 77A and 77B is such that they are not exposed to the outside of the liquid ejecting head 10. However, the configuration of the compliance substrates 77A and 77B may be such that they are exposed to the outside of the liquid ejecting head 10.

The compliance substrate 77A is provided for the flow channel 43A of the common liquid chamber RA. The compliance substrate 77A is located on the X1-direction side of the flow channel 43A. The compliance substrate 77A is disposed so as to cover an opening forming the flow channel 43A. The thickness direction of the compliance substrate 77A is oriented along the X-axis direction. The compliance substrate 77A extends in the Y-axis direction. The compliance substrate 77A is fixed to the case 28.

The compliance substrate 77B is provided for the flow channel 43B of the common liquid chamber RB. The compliance substrate 77B is located on the X2-direction side of the flow channel 43B. The compliance substrate 77B is disposed so as to cover an opening forming the flow channel 43B. The thickness direction of the compliance substrate 77B is oriented along the X-axis direction. The compliance substrate 77B extends in the Y-axis direction. The compliance substrate 77B is fixed to the case 28.

The configurations of the compliance substrates 77A and 77B may be similar to those of the compliance substrates 23A and 23B, for example. The compliance substrates 77A and 77B each include an elastic layer and an insulating layer. The elastic layer is made of silicon dioxide ($SiO_2$), for example. The insulating layer is made of zirconium dioxide ($ZrO_2$), for example.

The compliance substrate 77A is deformable under a pressure from the ink in the flow channel 43A of the common liquid chamber RA. The compliance substrate 77A can absorb variations in the pressure on the ink in the flow channel 43A of the common liquid chamber RA by deforming under the pressure from the ink.

The compliance substrate 77B is deformable under a pressure from the ink in the flow channel 43B of the common liquid chamber RB. The compliance substrate 77B can absorb variations in the pressure on the ink in the flow channel 43B of the common liquid chamber RB by deforming under the pressure from the ink.

In the liquid ejecting head 10 according to Embodiment 1, a length LX1 of the supply-side compliance substrates 23A in the X-axis direction is longer than a length LX2 of the discharge-side compliance substrates 23B in the X-axis direction. In the liquid ejecting head 10, the ink is ejected from the nozzles N and therefore the flow rate of the liquid flowing through the discharge flow channel 41B is lower than the flow rate of the liquid flowing through the supply flow channel 41A. Crosstalk or the like has a less impact on the discharge flow channel 41B than on the supply flow channel 41A. Accordingly, the compliability required for the discharge flow channel 41B is lower than that for the supply flow channel 41A. The crosstalk here refers to a phenomenon in which vibrations resulting from the flow of a liquid through one individual flow channel (a flow channel including an individual supply flow channel and an individual discharge flow channel) affects a liquid flowing through another individual flow channel adjacent to the one individual flow channel and deteriorates ejection characteristics of the liquid in the other individual flow channel. As mentioned above, the flow rate in the discharge flow channel 41B is lower than that in the supply flow channel 41A. Thus, the length of the discharge-side compliance substrates 23B in the X-axis direction does not need to be longer than that of the supply-side compliance substrates 23A. In the liquid ejecting head 10, the length LX2 of the discharge-side compliance substrates 23B is made shorter than the length LX1 of the supply-side compliance substrates 23A. In this way, the length of the liquid ejecting head 10 in the X-axis direction is shortened. This enables downsizing of the liquid ejecting head 10.

In the liquid ejecting head 10 according to Embodiment 1, the supply-side compliance substrates 23A are made larger to ensure compliability on the supply side, while the discharge-side compliance substrates 23B are made smaller to shorten the length of the liquid ejecting head 10 in the Y-axis direction, which enables space saving. With the liquid ejecting head 10, it is possible to both ensure compliability and achieve space saving.

In the liquid ejecting head 10, a length LX6 of the discharge flow channel 41B is longer than a length LX5 of the supply flow channel 41A. Here, the liquid ejecting head 10 is not limited to one in which the length LX6 of the discharge flow channel 41B is longer than the length LX5 of the supply flow channel 41A. When the length LX6 of the discharge flow channel 41B is longer than the length LX5 of the supply flow channel 41A and both have an equal cross-sectional area, the inertance of the discharge flow channel 41B is greater than the inertance of the supply flow channel 41A. Accordingly, the impact of crosstalk attenuates more easily in the discharge flow channel 41B than in the supply flow channel 41A. Considering that the inertance of the discharge flow channel 41B is greater than that of the supply flow channel 41A, it can be understood that the discharge-side compliance substrates 23B may be shorter than the supply-side compliance substrates 23A in the X-axis direction, even without taking into account the fact that the flow rate in the discharge flow channel 41B is lower than the flow rate in the supply flow channel 41A.

Also, in the liquid ejecting head 10, the piezoelectric elements 71A are provided on the compliance substrates 23A. Thus, by deforming the piezoelectric elements 71A with deformation of the compliance substrates 23A, vibrations of the ink inside the damper chambers DA can be absorbed. Providing the piezoelectric elements 71A on the compliance substrates 23A reinforces the compliance substrates 23A. The above applies also to the piezoelectric elements 71B.

In the liquid ejecting head 10, the vibration plate 26 and the compliance substrates 23A and 23B are formed integrally with each other, and the configurations of the piezoelectric elements 71A and 71B on the compliance substrates 23A and 23B are the same as the configuration of the piezoelectric elements 50 on the vibration plate 26. This enables easy manufacture of the piezoelectric elements 71A and 71B.

In the liquid ejecting head 10, a compliance amount CR of the discharge-side compliance substrates 23B is smaller than a compliance amount CS of the supply-side compliance substrates 23A. The compliance amounts CS and CR will be described later. When the compliance substrates 23A and 23B are the same in material, width in the Y-axis direction, and thickness in the Z-axis direction as in Embodiment 1, the compliance amounts CS and CR are proportional to the lengths of the compliance substrates 23A and 23B in the X-axis direction. In the liquid ejecting head 10, the discharge-side compliance amount CR can be made smaller than the supply-side compliance amount CS.

Compliance Amounts

Figure 9:
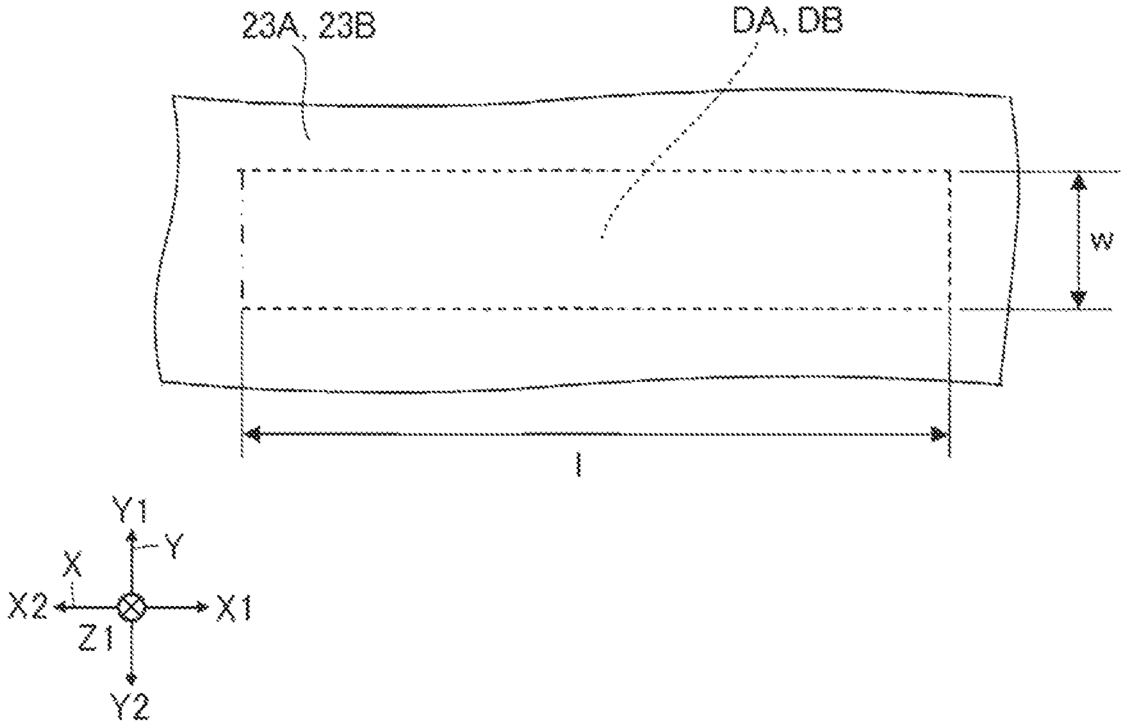
FIG. 9 is a plan view illustrating the length and width of the opening of a damper chamber formed under a compliance substrate.
Figure 10:
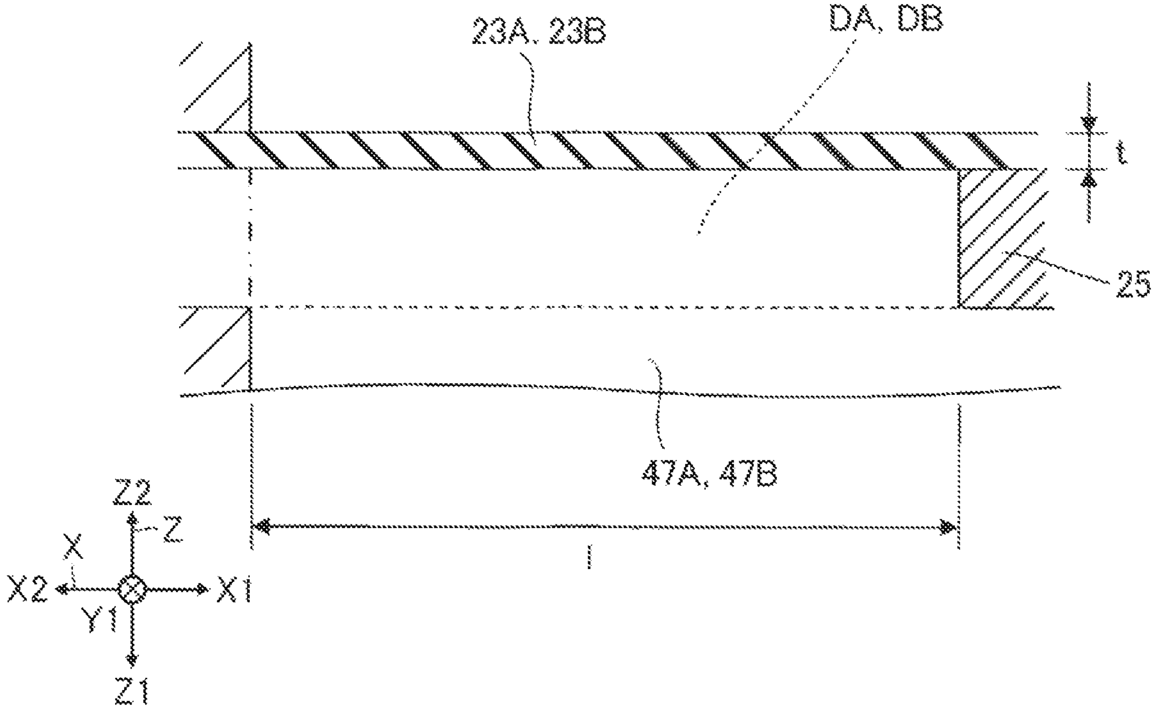
FIG. 10 is a cross-sectional view illustrating the thickness of the compliance substrate.

Next, the compliance amounts CS and CR in the liquid ejecting head 10 will be described. FIG. 9 is a plan view illustrating a length 1 and width w of the opening of the damper chamber DA formed under a compliance substrate 23A. FIG. 10 is a cross-sectional view illustrating a thickness t of the compliance substrate 23A.

The compliance amount CS is a compliance amount in the supply flow channel 41A. The compliance amount CR is a compliance amount in the discharge flow channel 41B. The compliance amounts CS and CR satisfy Equation (1) below. The supply-side compliance amount CS is larger than the discharge-side compliance amount CR. The supply-side compliance amount CS is an example of the supply-side compliability. The discharge-side compliance amount CR is an example of the discharge-side compliability.

$$CS>CR \tag{1}$$

Flow rates QS and QR of the ink flowing through the liquid ejecting head 10 satisfy Equation (2) below. The flow rate QS of the ink on the supply side is higher than the flow rate QR of the ink on the discharge side. The supply-side flow rate QS is the flow rate of the ink flowing through the supply flow channel 41A. The discharge-side flow rate QR is the flow rate of the ink flowing through the discharge flow channel 41B.

$$QS>QR \tag{2}$$

When the supply-side compliance amount CS and the discharge-side compliance amount CR are not distinguished, they will be expressed as the compliance amount C. Likewise, when the compliance substrates 23A and 23B are not distinguished, they will be expressed as the compliance substrates 23. The compliance amount C can be expressed using Equation (3) below.

$$c = \frac{1-v^2}{60E} \cdot \frac{w^5 l}{t^3} \tag{3}$$

In Equation (3), "v" denotes Poisson's ratio of the compliance substrates 23. "v" is a physical property value of the material forming the compliance substrates. "E" denotes Young's modulus. "E" is a physical property value of the material forming the compliance substrates.

"w" denotes the width of the openings covered by the compliance substrates. "w" is the width of the damper chambers DA and DB in the Y-axis direction. "l" denotes the length of the openings covered by the compliance substrates. "t" denotes the thickness of the compliance substrates.

Case 1

When, for example, an inertance MS of the supply flow channel 41A is lower than an inertance MR of the discharge flow channel 41B, variations in the pressure on the ink in the pressure chambers C are transmitted more easily to the ink in the supply flow channel 41A than to the ink in the discharge flow channel 41B. In this case, the compliance amounts CS and CR are set to satisfy Equation (4). The supply-side compliance amount CS is larger than the discharge-side compliance amount CR. In Embodiment 1, the inertance MS of the supply flow channel 41A is lower than the inertance MR of the discharge flow channel 41B.

$$CS>CR \tag{4}$$

Case 2

When, for example, an inertance MS of the supply flow channel 41A is higher than an inertance MR of the discharge flow channel 41B, variations in the pressure on the ink in the pressure chambers C are transmitted more easily to the ink in the discharge flow channel 41B than to the ink in the supply flow channel 41A. In this case, the compliance amounts CS and CR are set to satisfy Equation (5). The supply-side compliance amount CS is larger than the discharge-side compliance amount CR. In later-described Embodiment 8, the inertance MS of the supply flow channel 41A is higher than the inertance MR of the discharge flow channel 41B.

$$CS<CR \tag{5}$$

Embodiment 2

Figure 11:
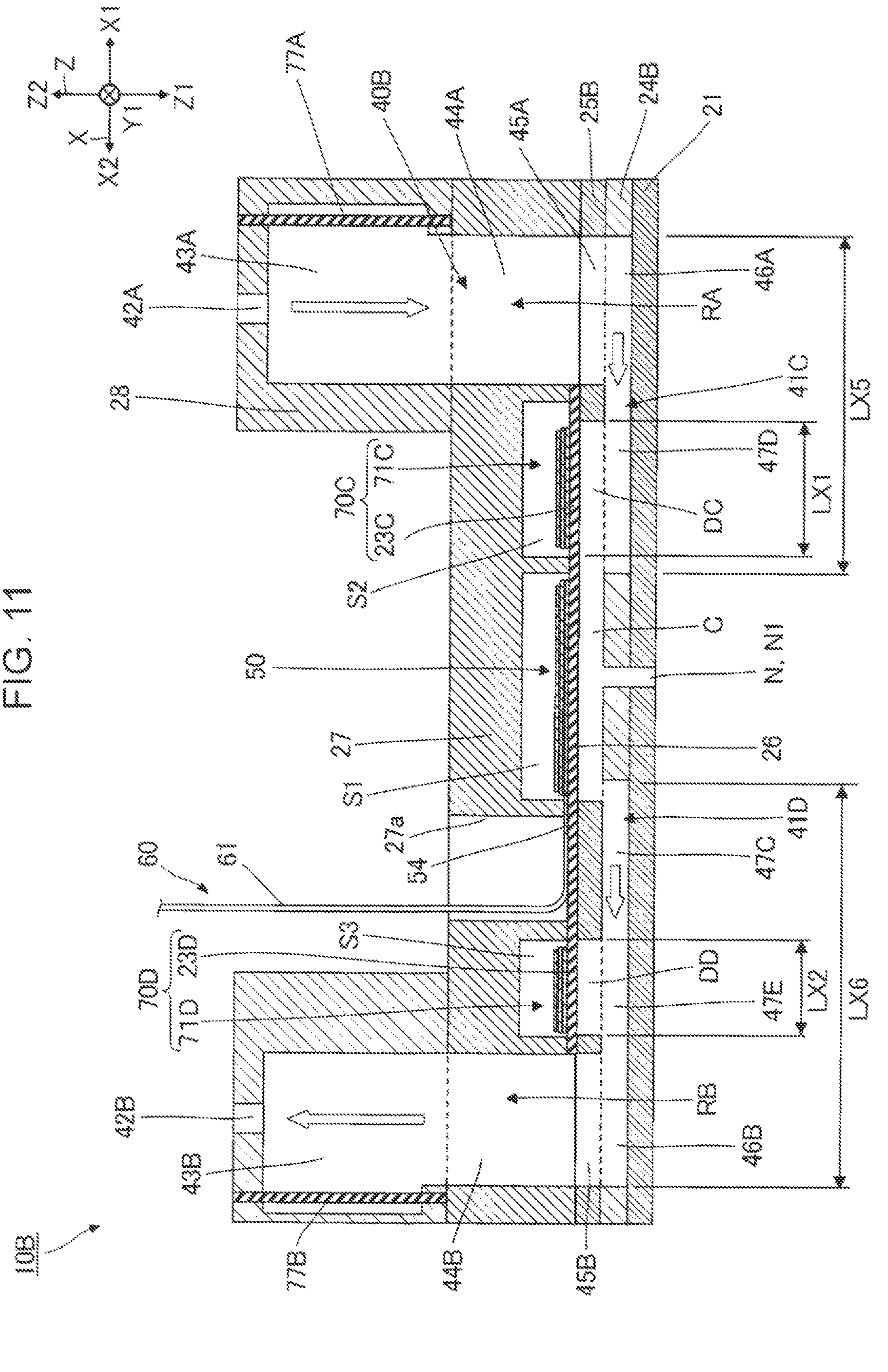
FIG. 11 is a cross-sectional view illustrating a liquid ejecting head according to Embodiment 2.
Figure 12:
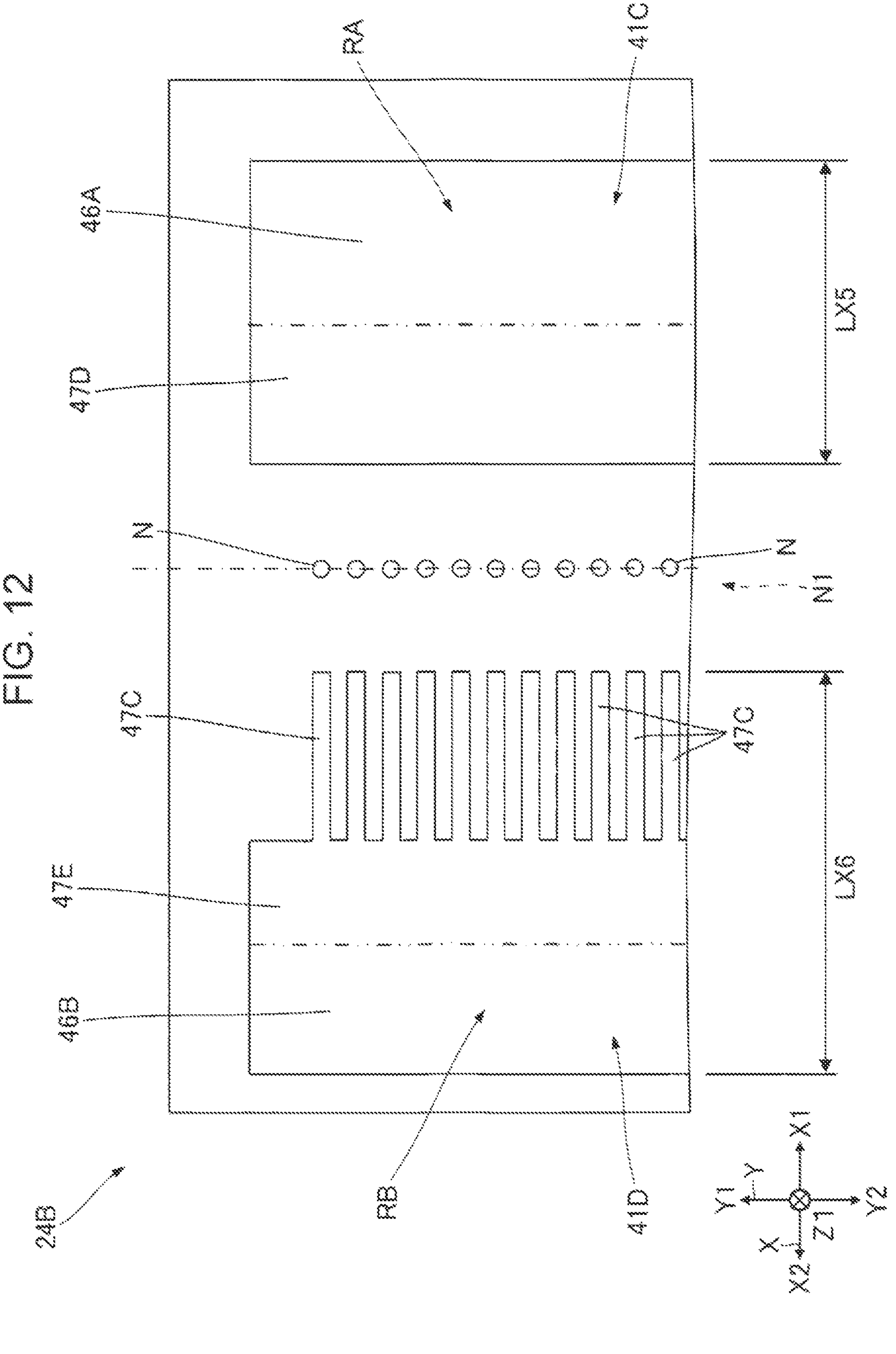
FIG. 12 is a plan view illustrating part of a communication plate according to Embodiment 2.
Figure 13:
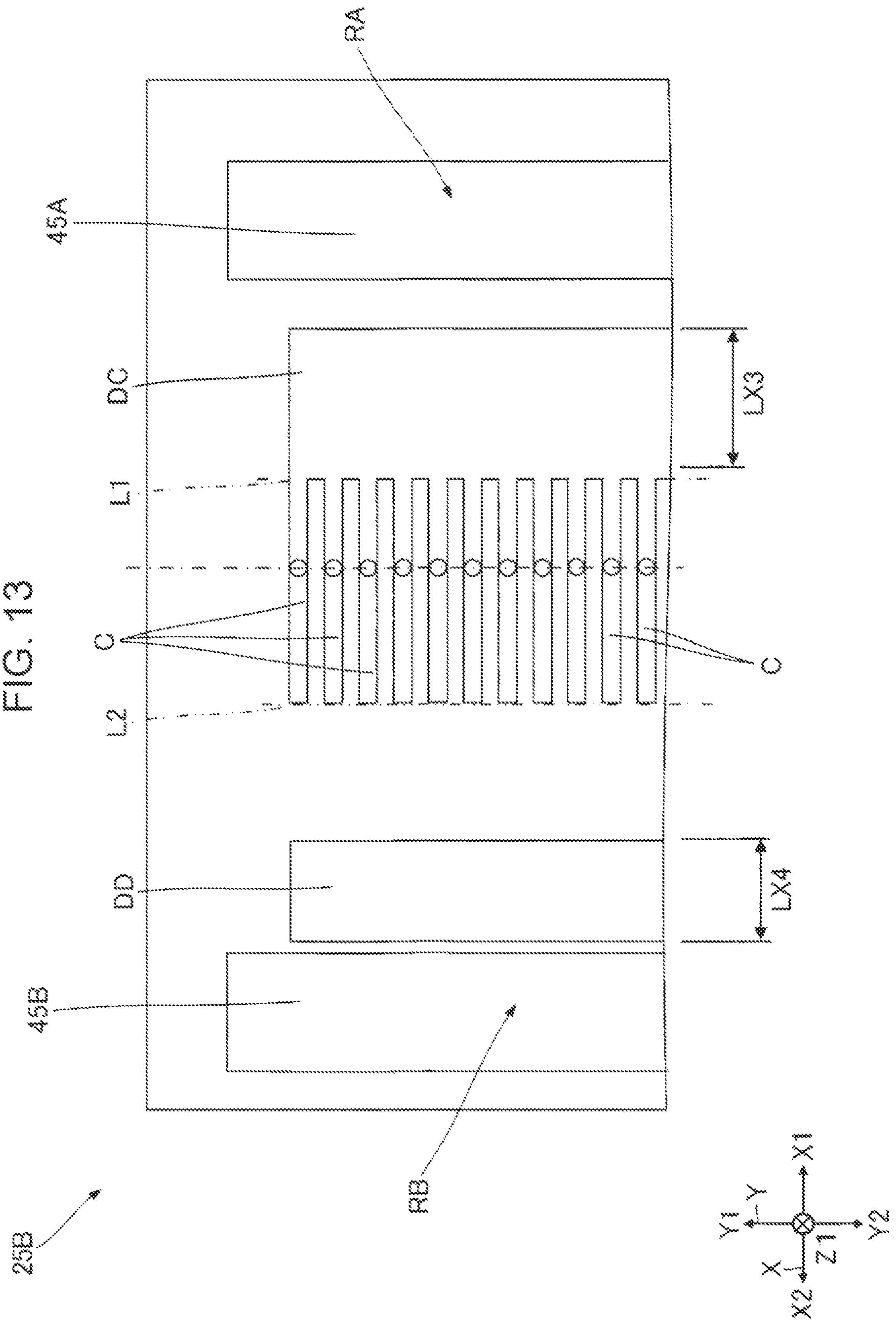
FIG. 13 is a plan view illustrating part of a pressure chamber substrate according to Embodiment 2.

Next, a liquid ejecting head 10B according to Embodiment 2 will be described. FIG. 11 is a cross-sectional view illustrating the liquid ejecting head 10B according to Embodiment 2. FIG. 12 is a plan view illustrating part of a communication plate 24B. FIG. 13 is a plan view illustrating part of a pressure chamber substrate 25B. The liquid ejecting head 10B according to Embodiment 2 differs from the liquid ejecting head 10 according to Embodiment 1 illustrated in FIG. 2 in that the former includes the communication plate 24B in place of the communication plate 24, the pressure chamber substrate 25B in place of the pressure chamber substrate 25, and vibration absorbing units 70C and 70D in place of the vibration absorbing units 70A and 70B. The description of Embodiment 2 may omit descriptions similar to those in Embodiment 1.

As illustrated in FIG. 11, the liquid ejecting head 10B includes a nozzle substrate 21, the communication plate 24B, the pressure chamber substrate 25B, a vibration plate 26, compliance substrates 23C and 23D, a sealing plate 27, a case 28, and a COF 60. The liquid ejecting head 10B includes the vibration absorbing units 70C and 70D. The supply-side vibration absorbing unit 70C has the compliance substrate 23C and piezoelectric elements 71C. The discharge-side vibration absorbing unit 70D has the compliance substrate 23D and piezoelectric elements 71D.

The liquid ejecting head 10B has an ink flow channel 40B. The ink flow channel 40B has a supply flow channel 41C and a discharge flow channel 41D. The supply flow channel 41C includes a flow channel 45A, a flow channel 46A, a communication flow channel 47D, and a damper chamber DC. The supply flow channel 41C includes a common supply flow channel provided in common for a plurality of pressure chambers C. The common supply flow channel includes the flow channel 45A, the flow channel 46A, the communication flow channel 47D, and the damper chamber DC.

The discharge flow channel 41D includes communication flow channels 47C, a communication flow channel 47E, a damper chamber DD, a flow channel 46B, and a flow channel 45B. The discharge flow channel 41D includes individual discharge flow channels provided respectively for the plurality of pressure chambers C. The individual discharge flow channels include the plurality of communication flow channels 47C. The discharge flow channel 41D includes a common discharge flow channel provided in common for the plurality of pressure chambers C. The common discharge flow channel includes the flow channel 45B, the flow channel 46B, the communication flow channels 47C, the communication flow channel 47E, and the damper chamber DD.

As illustrated in FIG. 12, in the communication plate 24B, there are formed the flow channel 46A, which is a part of a common liquid chamber RA, the communication flow channel 47D, the plurality of communication flow channels 47C, the communication flow channels 47E, and the flow channel 46B, which is a part of a common liquid chamber RB. Through-holes, grooves, recesses, and the like are formed in the communication plate 24. These through-holes, grooves, recesses, and the like form part of the common liquid chambers RA and RB and the communication flow channels 47D, 47C, and 47E.

As illustrated in FIG. 13, in the pressure chamber substrate 25B, there are formed the flow channel 45A, which is a part of the common liquid chamber RA, the damper chamber DC, the plurality of pressure chambers C, the damper chamber DD, and the flow channel 45B, which is a part of the common liquid chamber RB. A plurality of nozzles N are illustrated with dashed lines in FIG. 13.

The supply-side damper chamber DC is provided in common for the plurality of pressure chambers C. The damper chamber DC extends in the Y-axis direction. The damper chamber DC communicates with the plurality of pressure chambers C. The discharge-side damper chamber DD is provided in common for the plurality of pressure chambers C. The damper chamber DD extends in the Y-axis direction. The damper chamber DD communicates with the plurality of pressure chambers C through the plurality of communication flow channels 47C.

A length LX3 of the supply-side damper chamber DC in the X-axis direction is different from a length LX4 of the discharge-side damper chamber DB in the X-axis direction. The length LX3 of the supply-side damper chamber DC in the X-axis direction is longer than the length LX4 of the discharge-side damper chamber DD in the X-axis direction. The width of the damper chamber DC in the Y-axis direction is equal to the width of the damper chamber DD in the Y-axis direction.

In the liquid ejecting head 10B according to Embodiment 2, the supply-side compliance substrate 23C is provided in common for the plurality of pressure chambers C. In the liquid ejecting head 10B, the discharge-side compliance substrate 23D is provided in common for the plurality of pressure chambers C. The configuration of the liquid ejecting head 10B may be such that it includes such compliance substrates 23C and 23D.

Embodiment 3

Figure 14:
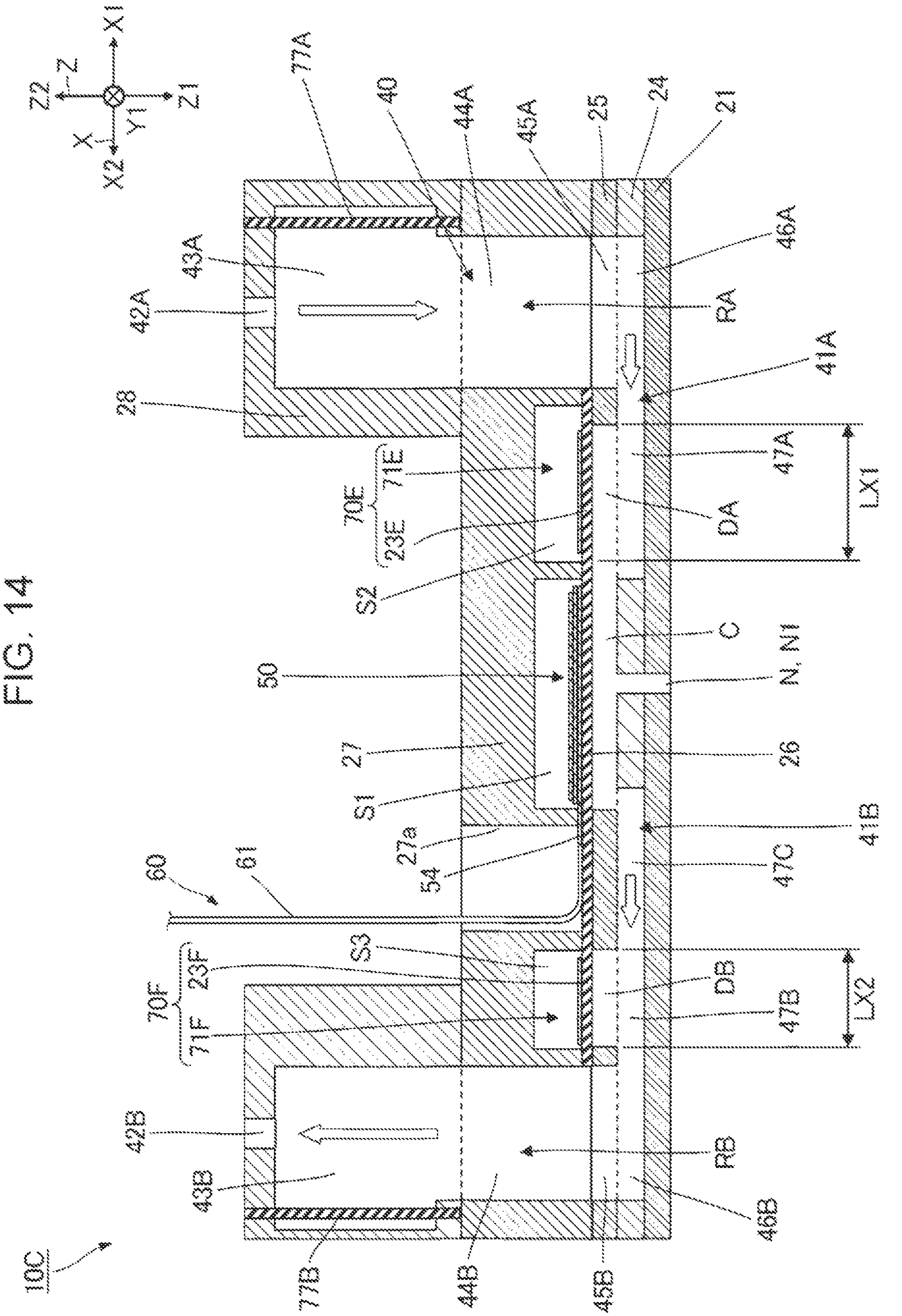
FIG. 14 is a cross-sectional view illustrating a liquid ejecting head according to Embodiment 3.
Figure 15:
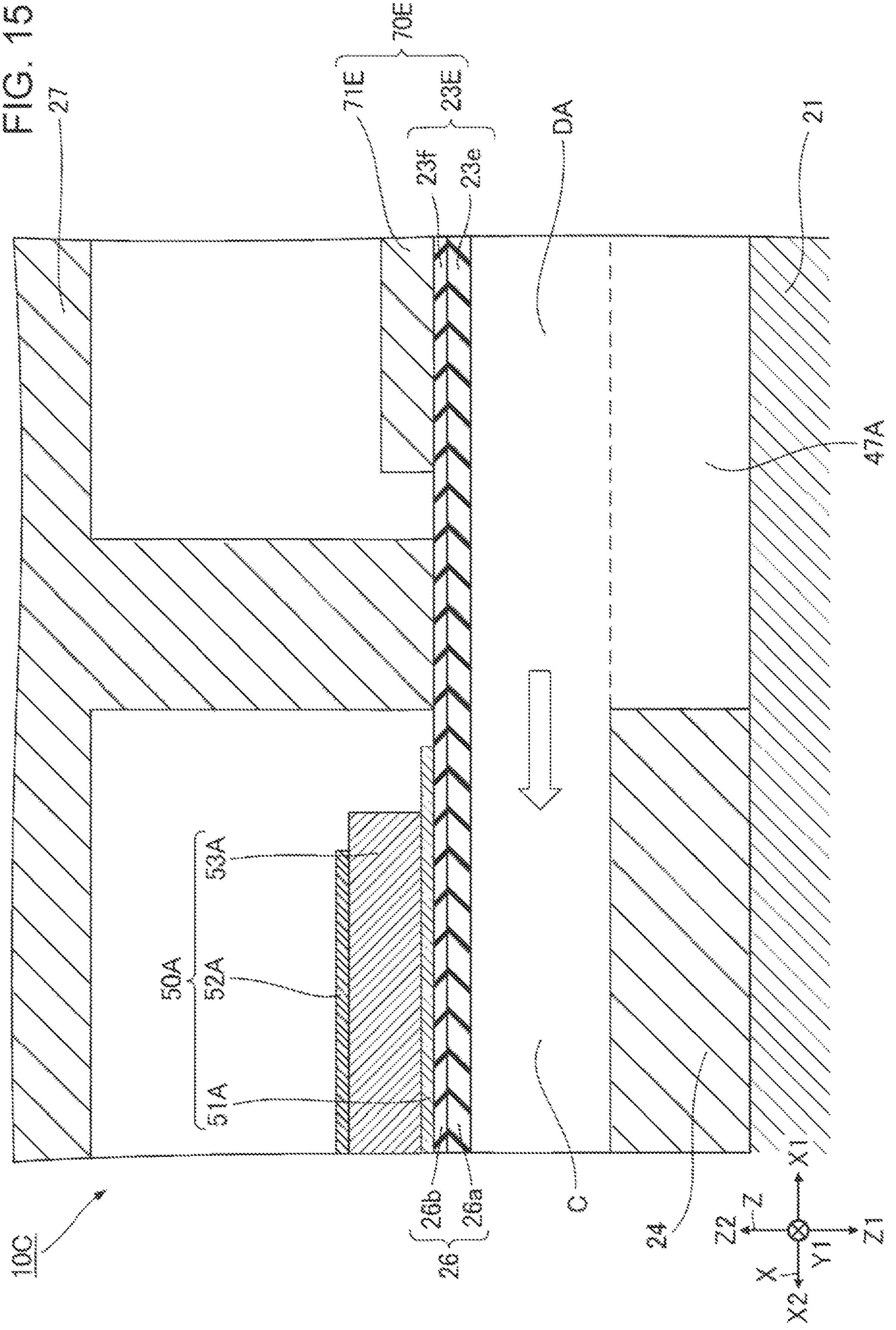
FIG. 15 is a cross-sectional view illustrating part of a supply-side vibration absorbing unit according to Embodiment 3.
Figure 16:
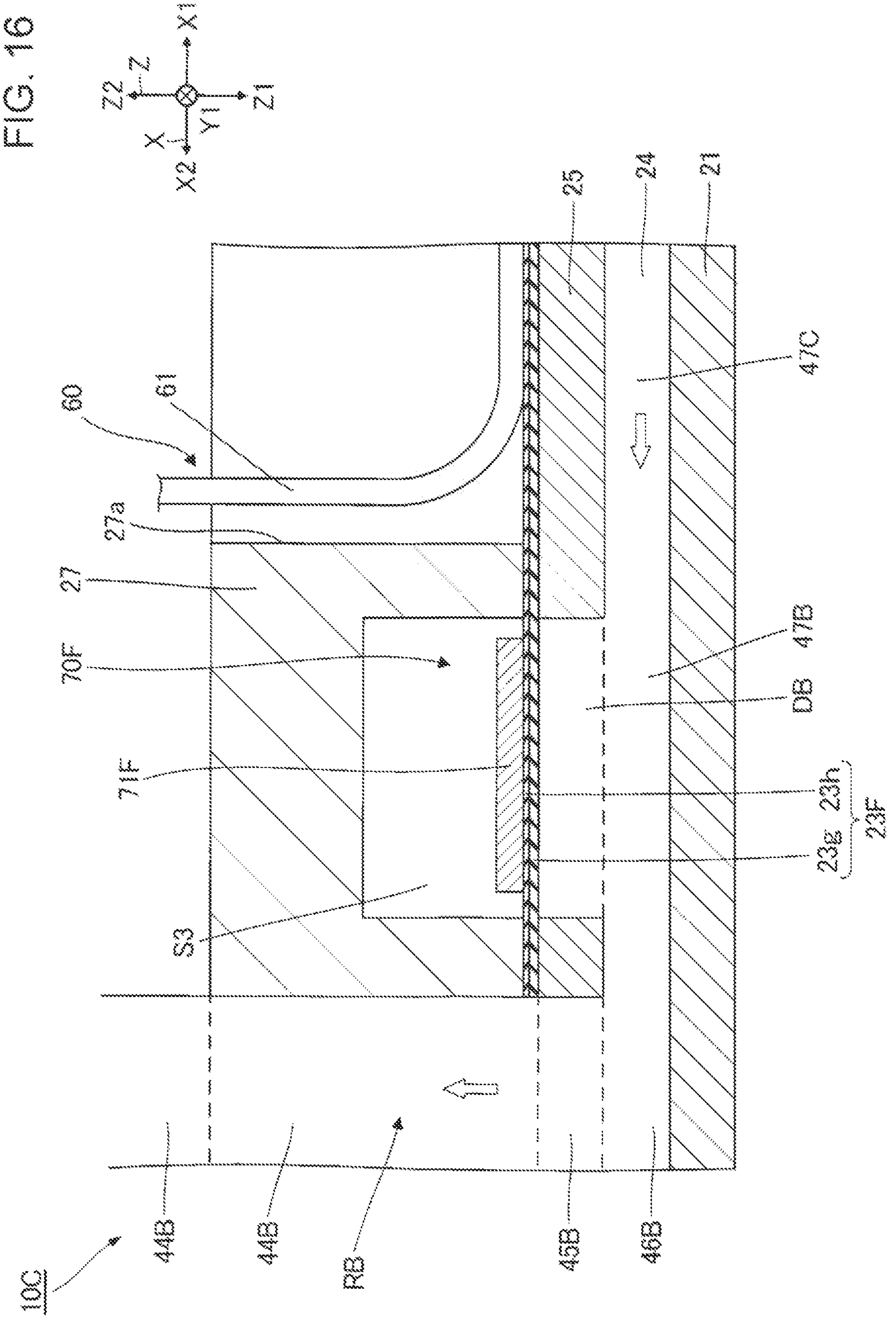
FIG. 16 is a cross-sectional view illustrating part of a discharge-side vibration absorbing unit according to Embodiment 3.

Next, a liquid ejecting head 10C according to Embodiment 3 will be described. FIG. 14 is a cross-sectional view illustrating the liquid ejecting head 10C according to Embodiment 3. FIG. 15 is a cross-sectional view illustrating part of a supply-side vibration absorbing unit 70E according to Embodiment 3. FIG. 16 is a cross-sectional view illustrating part of a discharge-side vibration absorbing unit 70F according to Embodiment 3. The liquid ejecting head 10C according to Embodiment 3 differs from the liquid ejecting head 10 according to Embodiment 1 illustrated in FIG. 2 in that the former includes the vibration absorbing unit 70E in place of the vibration absorbing unit 70A and the vibration absorbing unit 70F in place of the vibration absorbing unit 70B. The description of Embodiment 3 may omit descriptions similar to those in Embodiments 1 and 2.

As illustrated in FIG. 15, the supply-side vibration absorbing unit 70E includes compliance substrates 23E and a thin gold film 71E. The compliance substrates 23E each include a flexible film. The compliance substrates 23E each include an elastic layer 23*e* and an insulating layer 23*f*. The elastic layer 23*e* is made of silicon dioxide ($SiO_2$), for example. The insulating layer 23*f* is made of zirconium dioxide ($ZrO_2$), for example. The elastic layer 23*e* is formed on a pressure chamber substrate 25, and the insulating layer 23*f* is formed on the elastic layer 23*e*. The elastic layer 23*e* is formed so as to be continuous with an elastic layer 26*a* of a vibration plate 26 covering pressure chambers C. The insulating layer 23*f* is formed so as to be continuous with an insulating layer 26*b* of the vibration plate 26.

The plurality of compliance substrates 23E are provided respectively for a plurality of damper chambers DA arrayed in the Y-axis direction. The compliance substrates 23E are deformable under a pressure from the ink. The compliance substrates 23E can absorb variations in the pressure on the ink in the damper chambers DA by deforming under the pressure from the ink. The plurality of compliance substrates 23E individually deform for the plurality of damper chambers DA.

The thin gold film 71E is formed on the compliance substrates 23E. The thin gold film 71E has a predetermined length in the X-axis direction. The length of the thin gold film 71E in the X-axis direction is shorter than the length of the damper chambers DA in the X-axis direction. The thin gold film 71E has a predetermined length in the Y-axis direction. The thin gold film 71E is formed so as to cover the plurality of compliance substrates 23E, which are arrayed in the Y-axis direction. The thin gold film 71E may be provided individually for the plurality of compliance substrates 23E. The thin gold film 71E is formed from gold. It is preferable that the thickness of the thin gold film 71E be large to a certain extent in order to reinforce the strength of the compliance substrates 23E but be small to a certain extent in order to efficiently absorb variations in the pressure on the ink in the damper chambers DA. Experiments showed that the above two advantageous effects could be suitably achieved when the thickness was 0.7 to 1.3 μm. The vibration absorbing unit 70E may include a thin metal film formed from a metal other than gold, e.g., tin, copper, or aluminum, in place of the thin gold film 71E.

As illustrated in FIG. 16, the discharge-side vibration absorbing unit 70F includes compliance substrates 23F and a thin gold film 71F. The compliance substrates 23F each include a flexible film. The compliance substrates 23F each include an elastic layer 23*g* and an insulating layer 23*h*. The elastic layer 23*g* is made of silicon dioxide ($SiO_2$), for example. The insulating layer 23*h* is made of zirconium dioxide ($ZrO_2$), for example. The elastic layer 23*g* is formed on the pressure chamber substrate 25, and the insulating layer 23*h* is formed on the elastic layer 23*g*. The elastic layer 23*g* is formed so as to be continuous with the elastic layer 26*a* of the vibration plate 26 covering the pressure chambers C. The insulating layer 23*h* is formed so as to be continuous with the insulating layer 26*b* of the vibration plate 26.

The plurality of compliance substrates 23F are provided respectively for a plurality of damper chambers DB arrayed in the Y-axis direction. The compliance substrates 23F are deformable under a pressure from the ink. The compliance substrates 23F can absorb variations in the pressure on the ink in the damper chambers DB by deforming under the pressure from the ink. The plurality of compliance substrates 23F individually deform for the plurality of damper chambers DB.

The thin gold film 71F is formed on the compliance substrates 23F. The thin gold film 71F has a predetermined length in the X-axis direction. The length of the thin gold film 71F in the X-axis direction is shorter than the length of the damper chambers DB in the X-axis direction. The thin gold film 71F has a predetermined length in the Y-axis direction. The thin gold film 71F is formed so as to cover the plurality of compliance substrates 23F, which are arrayed in the Y-axis direction. The thin gold film 71F may be provided individually for the plurality of compliance substrates 23F. The thin gold film 71F is formed from gold. It is preferable that the thickness of the thin gold film 71F be large to a certain extent in order to reinforce the strength of the compliance substrates 23F but be small to a certain extent in order to efficiently absorb variations in the pressure on the ink in the damper chambers DB. Experiments showed that the above two advantageous effects could be suitably achieved when the thickness was 0.7 to 1.3 μm. The vibration absorbing unit 70F may include a thin metal film formed from a metal other than gold, e.g., tin, copper, or aluminum, in place of the thin gold film 71F.

As described above, the liquid ejecting head 10C may include the thin gold film 71E formed on the compliance substrates 23E. The liquid ejecting head 10C may include the thin gold film 71F formed on the compliance substrates 23F. Since the thin gold films 71E and 71F are formed on the compliance substrates 23E and 23F in the liquid ejecting head 10C, the strength of the compliance substrates 23E and 23F is reinforced. This improves the reliability of the compliance substrates 23E and 23F.

Here, the ease of deformation of the compliance substrates 23E and 23F can be changed by changing the thickness of the thin gold films 71E and 71F. The efficiency of vibration absorption by the vibration absorbing units 70E and 70F may be changed by changing the thickness of the thin gold films 71E and 71F. The ease of deformation of the compliance substrates 23E and 23F may be changed by changing the material of the thin metal films on the compliance substrates 23E and 23F.

Embodiment 4

Next, a liquid ejecting head 10 according to Embodiment 4 will be described. Illustration of the liquid ejecting head 10 according to Embodiment 4 is omitted. Cross-sectional views of the liquid ejecting head 10 according to Embodiment 4 are substantially the same as the cross-sectional views of the liquid ejecting head 10C according to Embodiment 3 illustrated in FIGS. 14 to 16. The liquid ejecting head 10 according to Embodiment 4 differs from the liquid ejecting head 10C according to Embodiment 3 illustrated in FIG. 14 in that the former includes damper chambers DC and DD in place of the damper chambers DA and DB and communication flow channels 47D and 47E in place of the communication flow channels 47A and 47B. The damper chambers DC and DD and the communication flow channels 47D and 47E are the same as the damper chambers DC and DD and the communication flow channels 47D and 47E in Embodiment 2 illustrated in FIG. 11.

In the liquid ejecting head 10 according to Embodiment 4, a thin gold film 71E is formed on a compliance substrate 23C covering the damper chamber DC, which is a common supply flow channel. In the liquid ejecting head 10 according to Embodiment 4, a thin gold film 71F is formed on a compliance substrate 23D covering the damper chamber DD, which is a common discharge flow channel. The thin gold films 71E and 71F can be formed similarly to the thin gold films 71E and 71F in Embodiment 3 described above.

Embodiment 5

Next, a liquid ejecting head 10E according to Embodiment 5 will be described. A cross-sectional view of the liquid ejecting head 10E according to Embodiment 5 is substantially the same as the cross-sectional view of the liquid ejecting head 10 according to Embodiment 1 illustrated in FIG. 2. The liquid ejecting head 10E according to Embodiment 5 differs from the liquid ejecting head 10 according to Embodiment 1 illustrated in FIG. 2 in that the former includes a damper chamber DC in place of the damper chambers DA, a communication flow channel 47D in place of the communication flow channels 47A, and a vibration absorbing unit 70C in place of the vibration absorbing unit 70A. The damper chamber DC, the communication flow channel 47D, and the vibration absorbing unit 70C are the same as the damper chamber DC, the communication flow channel 47D, and the vibration absorbing unit 70C in Embodiment 2 illustrated in FIG. 11.

Figure 17:
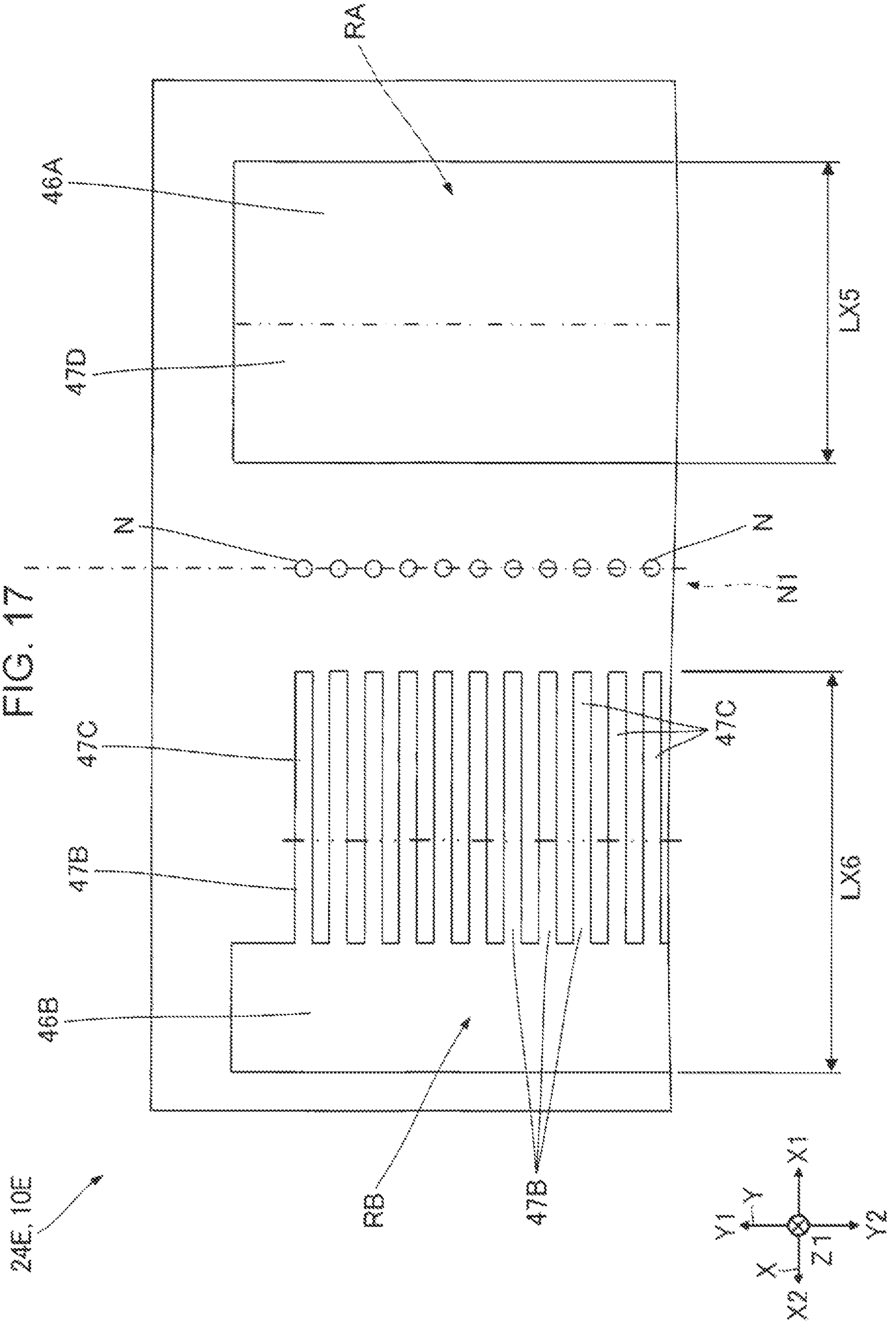
FIG. 17 is a plan view illustrating part of a communication plate according to Embodiment 5.

FIG. 17 is a plan view illustrating part of a communication plate 24E of the liquid ejecting head 10E according to Embodiment 5. The liquid ejecting head 10E includes the communication plate 24E in place of the communication plate 24 in Embodiment 1. In the communication plate 24E, there are formed the communication flow channel 47D included in a common supply flow channel and communication flow channels 47B included in individual discharge flow channels.

Figure 18:
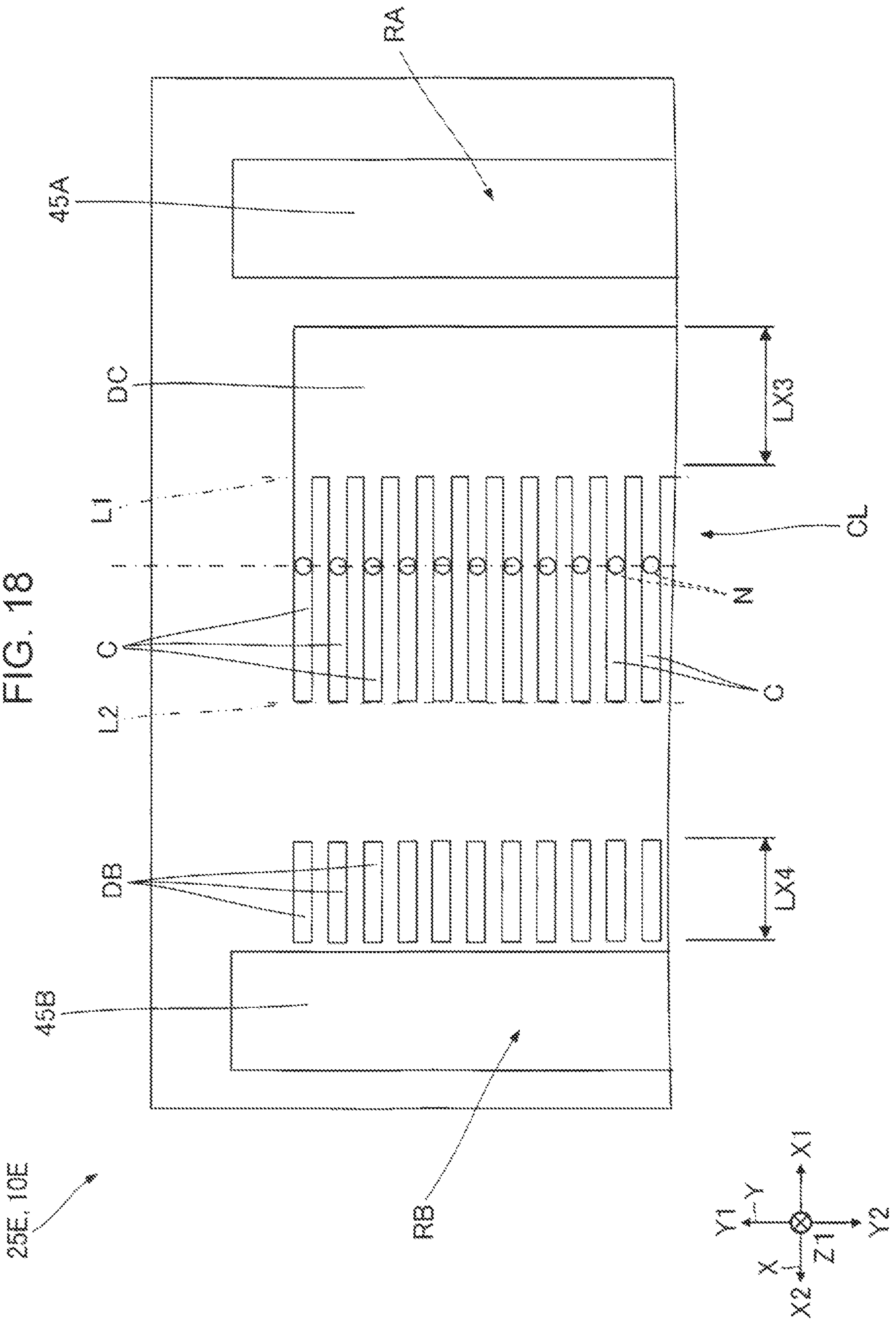
FIG. 18 is a plan view illustrating part of a pressure chamber substrate according to Embodiment 5.

FIG. 18 is a plan view illustrating part of a pressure chamber substrate 25E of the liquid ejecting head 10E according to Embodiment 5. The liquid ejecting head 10E includes the pressure chamber substrate 25E in place of the pressure chamber substrate 25 in Embodiment 1. In the pressure chamber substrate 25E, there are formed the damper chamber DC included in the common supply flow channel and damper chambers DB included in the individual discharge flow channels.

As described above, in the liquid ejecting head 10E, the supply-side damper chamber DC is provided in common for a plurality of pressure chambers C, and the discharge-side damper chambers DB are provided individually and respectively for the plurality of pressure chambers C. In the liquid ejecting head 10E, a compliance substrate 23C is provided in common for the plurality of pressure chambers C. In the liquid ejecting head 10E, compliance substrates 23B are provided respectively for the plurality of pressure chambers C. In the liquid ejecting head 10E, the compliance substrates 23B are provided individually for the plurality of pressure chambers C.

Embodiment 6

Next, a liquid ejecting head 10 according to Embodiment 6 will be described. Illustration of the liquid ejecting head 10 according to Embodiment 6 is omitted. A cross-sectional view of the liquid ejecting head 10 according to Embodiment 6 is substantially the same as the cross-sectional view of the liquid ejecting head 10C according to Embodiment 3 illustrated in FIG. 14. The liquid ejecting head 10 according to Embodiment 6 differs from the liquid ejecting head 10C according to Embodiment 3 illustrated in FIG. 14 in that the former includes a damper chamber DC in place of the damper chambers DA and a communication flow channel 47D in place of the communication flow channels 47A. The damper chamber DC, the communication flow channel 47D, and a vibration absorbing unit 70C are the same as the damper chamber DC, the communication flow channel 47D, and the vibration absorbing unit 70C in Embodiment 2 illustrated in FIG. 11.

The communication plate in Embodiment 6 is the same as the communication plate 24E in Embodiment 5 illustrated in FIG. 17. The pressure chamber substrate in Embodiment 6 is the same as the pressure chamber substrate 25E in Embodiment 5 illustrated in FIG. 18.

The liquid ejecting head 10 according to Embodiment 6 includes a supply-side vibration absorbing unit 70E and a discharge-side vibration absorbing unit 70F. A cross-sectional view of the supply-side vibration absorbing unit 70E is substantially the same as that of the vibration absorbing unit 70E illustrated in FIG. 15. In Embodiment 6, compliance substrates 23E are provided. The compliance substrates 23E are provided for the damper chamber DC, which is a common supply flow channel. The supply-side vibration absorbing unit 70E includes the compliance substrates 23E provided for the common damper chamber DC, and a thin gold film 71E provided on these compliance substrates 23E.

A cross-sectional view of the supply-side vibration absorbing unit 70F is the same as that of the vibration absorbing unit 70F illustrated in FIG. 16. In Embodiment 6, compliance substrates 23F are provided. The compliance substrates 23F are provided for damper chambers DB, which are individual discharge flow channels. The discharge-side vibration absorbing unit 70F includes a plurality of compliance substrates 23F provided respectively for the plurality of damper chambers DB, and a thin gold film 71F provided on these compliance substrates 23F.

In the liquid ejecting head 10 according to Embodiment 6, the thin gold films 71E and 71F are provided on the compliance substrates 23E and 23F.

Embodiment 7

Next, a liquid ejecting head 10 according to Embodiment 7 will be described. Illustration of the liquid ejecting head 10 according to Embodiment 7 is omitted. A cross-sectional view of the liquid ejecting head 10 according to Embodiment 7 is substantially the same as the cross-sectional view of the liquid ejecting head 10B according to Embodiment 2 illustrated in FIG. 11. The liquid ejecting head 10 according to Embodiment 7 differs from the liquid ejecting head 10B according to Embodiment 2 illustrated in FIG. 11 in that the former includes a vibration absorbing unit 70E in place of the vibration absorbing unit 70C. In Embodiment 7, the supply-side vibration absorbing unit 70E has a thin gold film 71E, and a discharge-side vibration absorbing unit 70D has piezoelectric elements 71D.

In Embodiment 7, the structure provided on a supply-side compliance substrate 23C and the structure provided on a discharge-side compliance substrate 23D are different. Making the structures on the compliance substrates 23C and 23D different as above can provide a difference between the vibration absorption performance on the supply side and the vibration absorption performance on the discharge side.

For example, as a modification of Embodiment 7, piezoelectric elements 71A may be provided on the supply-side compliance substrate 23C, and a thin gold film 71F may be provided on the discharge-side compliance substrate 23D. In the liquid ejecting heads 10 according to the other embodiments too, the structures on the supply-side and discharge-side compliance substrates may be different.

Embodiment 8

Figure 19:
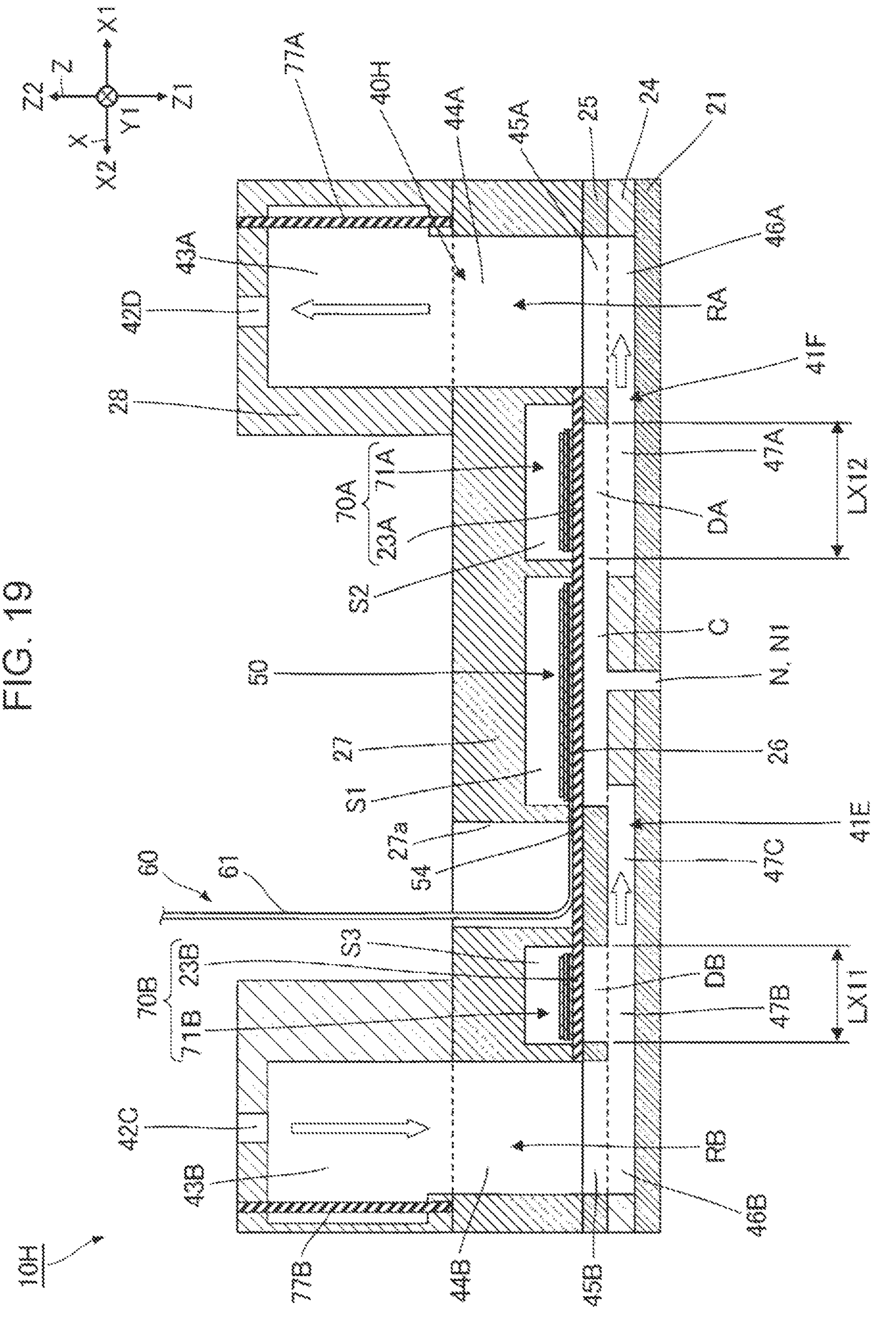
FIG. 19 is a cross-sectional view illustrating a liquid ejecting head according to Embodiment 8.

Next, a liquid ejecting head 10H according to Embodiment 8 will be described. FIG. 19 is a cross-sectional view illustrating the liquid ejecting head 10H according to Embodiment 8. The liquid ejecting head 10H according to Embodiment 8 illustrated in FIG. 19 differs from the liquid ejecting head 10 according to Embodiment 1 illustrated in FIG. 2 in that the flow direction of the liquid is different. The flow direction of the liquid in the liquid ejecting head 10H according to Embodiment 8 is the reverse of the flow direction of the liquid in the liquid ejecting head 10 according to Embodiment 1. In FIG. 19, the flow direction of the liquid is indicated by arrows. In FIG. 19, most of the reference signs shown are the same as those in FIG. 1, but the flow direction of the liquid is the reverse of that in FIG. 1. The description of the liquid ejecting head 10H according to Embodiment 8 may omit descriptions similar to those of the liquid ejecting heads 10 according to Embodiments 1 to 7 given above.

In the liquid ejecting head 10H, a flow channel 40H through which the ink flows is formed. The flow channel 40H includes a supply port 42C, a discharge port 42D, common liquid chambers RA and RB, damper chambers DA and DB, pressure chambers C, communication flow channels 47A to 47C, and nozzles N.

The flow channel 40H has a supply flow channel 41E and a discharge flow channel 41F. The supply flow channel 41E is a flow channel upstream of the pressure chambers C, and is a flow channel inside a communication plate 24 and a pressure chamber substrate 25. The supply flow channel 41E includes a flow channel 45B, a flow channel 46B, communication flow channels 47B, damper chambers DB, and communication flow channels 47C. The discharge flow channel 41F is a flow channel downstream of the pressure chambers C, and is a flow channel inside the communication plate 24 and the pressure chamber substrate 25. The discharge flow channel 41F includes damper chambers DA, communication flow channels 47A, a flow channel 46A, and a flow channel 45A.

The liquid ejecting head 10H includes the supply-side damper chambers DB and the discharge-side damper chambers DA. The liquid ejecting head 10H includes a supply-side vibration absorbing unit 70B and a discharge-side vibration absorbing unit 70A. In this case, compliance substrates 23B are supply-side compliance substrates. The compliance substrates 23A are discharge-side compliance substrates.

In Embodiment 8, a length LX12 of the discharge-side compliance substrates 23A in the X-axis direction is longer than a length LX11 of the supply-side compliance substrates 23B in the X-axis direction.

As mentioned above, a length LX12 of the discharge-side compliance substrates 23A in the X-axis direction may be longer than a length LX11 of the supply-side compliance substrates 23B in the X-axis direction.

In Embodiment 8, the compliability of the discharge-side compliance substrates 23A is higher than the compliability of the supply-side compliance substrates 23B. The compliance substrates 23A and 23B are made of the same material and have the same thickness. The compliability of the compliance substrates 23A is higher than the compliability of the compliance substrates 23B since the length LX12 of the compliance substrates 23A in the X-axis direction is longer than the length LX11 of the compliance substrates 23B in the X-axis direction.

In Embodiment 8, the inertance of the discharge flow channel 41F is higher than the inertance of the supply flow channel 41E. In Embodiment 8, the compliability of each of the compliance substrates 23A and 23B is set according to the magnitude of its inertance.

Liquid Ejecting Apparatus

Figure 21:
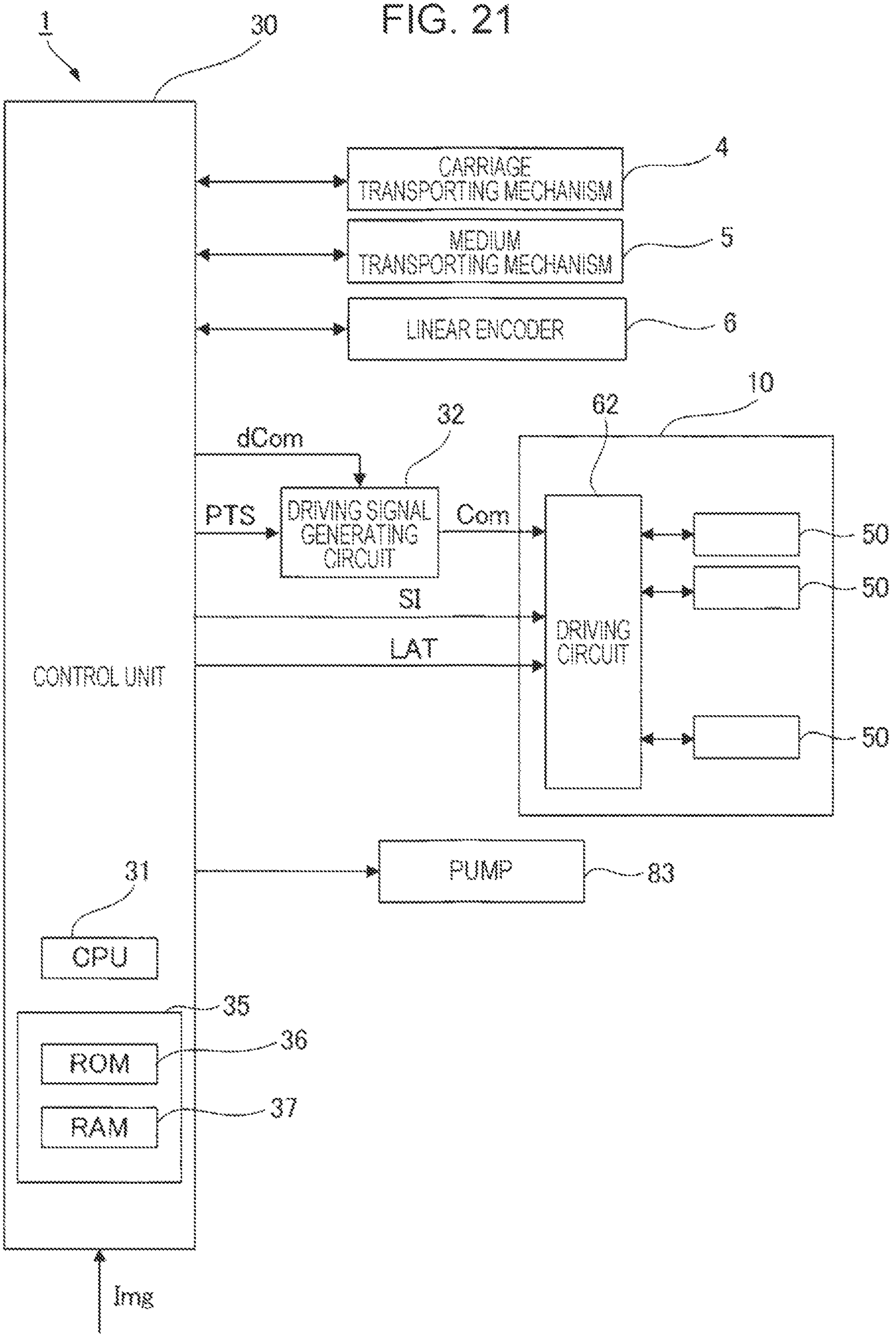
FIG. 21 is a block diagram illustrating the liquid ejecting apparatus according to the embodiment.

Next, a liquid ejecting apparatus 1 including a liquid ejecting head 10 will be described with reference to FIGS. 20 and 21. FIG. 20 is a schematic diagram illustrating the liquid ejecting apparatus 1 including a liquid ejecting head 10. The liquid ejecting apparatus 1 includes the liquid ejecting head 10 according to Embodiment 1 described above. FIG. 21 is a block diagram illustrating the liquid ejecting apparatus 1. The liquid ejecting apparatus 1 is not limited to the configuration including the liquid ejecting head 10 according to Embodiment 1. The liquid ejecting apparatus 1 may include any of the liquid ejecting heads 10B to 10G according to Embodiments 2 to 7 in place of the liquid ejecting head 10 according to Embodiment 1.

The liquid ejecting apparatus 1 is an ink jet printing apparatus that ejects an ink, which is an example of "liquid", in the form of droplets onto a medium PA. The liquid ejecting apparatus 1 is a serial-type printing apparatus. The medium PA is typically print paper. The medium PA is not limited to print paper and may be a printing target of any material such as a resin film or a woven fabric, for example.

The liquid ejecting apparatus 1 includes the liquid ejecting head 10, which ejects the ink, a liquid container 2 which stores the ink, a carriage 3 which carries the liquid ejecting head 10, a carriage transporting mechanism 4 which transports the carriage 3, a medium transporting mechanism 5 which transports the medium PA, and a control unit 30. The control unit 30 is a control unit which controls the liquid ejection.

Examples of specific forms of the liquid container 2 include a cartridge detachably attachable to the liquid ejecting apparatus 1, a bag-shaped ink pack formed from a flexible film, and an ink tank that can be filled with an ink. The liquid container 2 may store any type of ink. In an example, the liquid ejecting apparatus 1 includes a plurality of liquid containers 2 for inks of four colors. Examples of the inks of the four colors include cyan, magenta, yellow, and black inks. The liquid containers 2 may be mounted on the carriage 3.

The liquid ejecting apparatus 1 includes a circulating mechanism 8 which circulates the ink. The circulating mechanism 8 includes a supply flow channel 81 through which the ink is supplied to the liquid ejecting head 10, a collection flow channel 82 through which the ink discharged from the liquid ejecting head 10 is collected, and a pump 83 which sends the ink.

The carriage transporting mechanism 4 has a transporting belt 4*a* and a motor for transporting the carriage 3. The medium transporting mechanism 5 has a transporting roller 5*a* and a motor for transporting the medium PA. The carriage transporting mechanism 4 and the medium transporting mechanism 5 are controlled by the control unit 30. While transporting the medium PA with the medium transporting mechanism 5 and at the same time transporting the carriage 3 with the carriage transporting mechanism 4, the liquid ejecting apparatus 1 ejects ink droplets onto the medium PA to perform printing.

As illustrated in FIG. 21, the liquid ejecting apparatus 1 includes a linear encoder 6. The linear encoder 6 is provided at such a position as to be capable of detecting the position of the carriage 3. The linear encoder 6 obtains information on the position of the carriage 3. As the carriage 3 moves, the linear encoder 6 outputs an encoder signal to the control unit 30.

The control unit 30 includes one or more CPUs 31. The control unit 30 may include an FPGA in place of the CPUs 31 or in addition to the CPUs 31. The control unit 30 includes a storage unit 35. The storage unit 35 includes, for example, a ROM 36 and a RAM 37. The storage unit 35 may include an EEPROM or a PROM. The storage unit 35 is capable of storing print data Img supplied from a host computer. The storage unit 35 stores a program for controlling the liquid ejecting apparatus 1.

CPU stands for Central Processing Unit. FPGA stands for Field-Programmable Gate Array. RAM stands for Random Access Memory. ROM stands for Read Only Memory. EEPROM stands for Electrically Erasable Programmable Read-Only Memory. PROM stands for Programmable ROM.

The control unit 30 generates signals for controlling the operations of components of the liquid ejecting apparatus 1. The control unit 30 is capable of generating a print signal SI and a waveform designating signal dCom. The print signal SI is a digital signal for designating the type of operation of the liquid ejecting head 10. The print signal SI can designate whether to supply a driving signal Com to the piezoelectric elements 50. The waveform designating signal dCom is a digital signal that specifies the waveform of the driving signal Com. The driving signal Com is an analog signal for driving the piezoelectric elements 50.

The liquid ejecting apparatus 1 includes a driving signal generating circuit 32. The driving signal generating circuit 32 is electrically coupled to the control unit 30. The driving signal generating circuit 32 includes a DA conversion circuit. The driving signal generating circuit 32 generates the driving signal Com having the waveform specified by the waveform designating signal dCom. In response to receiving an encoder signal from the linear encoder 6, the control unit 30 outputs a timing signal PTS to the driving signal generating circuit 32. The timing signal PTS specifies a timing to generate the driving signal Com. The driving signal generating circuit 32 generates the driving signal Com each time it receives the timing signal PTS.

The driving circuit 62 is electrically coupled to the control unit 30 and the driving signal generating circuit 32. Based on the print signal SI, the driving circuit 62 switches to supplying or not supplying the driving signal Com to the piezoelectric elements 50. The driving circuit 62 is capable of selecting the piezoelectric elements 50 to supply the driving signal Com based on the print signal SI, a latch signal LAT, and, a change signal CH supplied from the control unit 30. The latch signal LAT specifies a latch timing for the print data Img. The change signal CH specifies timings to select driving pulses to be included in the driving signal Com.

The control unit 30 controls the ink ejection operation of liquid ejecting head 10. By driving the piezoelectric elements 50 as described above, the control unit 30 changes the pressure on the ink in the pressure chambers C to eject the ink from the nozzles N. The control unit 30 controls the ejection operation when performing a printing operation.

In such a liquid ejecting apparatus 1, the liquid ejecting head 10 described above can be used. In the liquid ejecting apparatus 1 including the liquid ejecting head 10, the length LX1 of the supply-side compliance substrates 23A in the X-axis direction is longer than the length LX2 of the discharge-side compliance substrates 23B in the X-axis direction. Making the length LX2 of the discharge-side compliance substrates 23B shorter than the length LX1 of the supply-side compliance substrates 23A enables downsizing of the liquid ejecting head 10.

The above-described embodiments merely illustrate representative forms of the present disclosure. The present disclosure is not limited to the above-described embodiments, and various changes and additions can be made without departing from the gist of the present disclosure.

Modification 1

In the liquid ejecting head 10 according to Embodiment 1 described above, the compliance substrates 23A and 23B are provided at the same position in the Z-axis direction as the vibration plate 26. However, the compliance substrates 23A and 23B may be provided at a different position in the Z-axis direction from the vibration plate 26. For example, the supply-side compliance substrates 23A may be provided on the Z1-direction side of the communication flow channels 47A. The discharge-side compliance substrates 23B may be provided on the Z1-direction side of the communication flow channels 47B. The compliance substrates 23A and 23B may be provided at the nozzle substrate 21.

Modification 2

The liquid ejecting head 10 according to Embodiment 1 described above has a configuration with the compliance substrates 77A and 77B provided in the common liquid chambers RA and RB. However, the liquid ejecting head 10 may have a configuration without the compliance substrates 77A and 77B. The compliance amount of the supply-side compliance substrate 77A and the compliance amount of the discharge-side compliance substrate 77B may be different. The compliance substrates 77A and 77B may have different sizes.

Modification 3

In the liquid ejecting head 10 according to Embodiment 1 described above, the COF 60 is disposed between the piezoelectric elements 50 and the discharge-side compliance substrates 23B in the X-axis direction. However, the arrangement of the COF 60 is not limited to this one. For example, the COF 60 may be disposed between the piezoelectric elements 50 and the supply-side compliance substrates 23A in the X-axis direction.

Modification 4

In the liquid ejecting head 10 according to Embodiment 1 described above, the nozzles N are disposed at positions overlapping the pressure chambers C as viewed from the Z-axis direction. However, the nozzles N may be disposed at positions not overlapping the pressure chambers C. Also, the configuration of the liquid ejecting head 10 may be such that a plurality of pressure chambers C communicate with a single nozzle N.

Modification 5

In the liquid ejecting head 10 according to Embodiment 1 described above, the vibration absorbing unit 70A has a configuration in which it includes the individual electrode layers 71*a*, the common electrode layer 71*b*, and the piezoelectric layers 71*c* on the compliance substrates 23A. However, the vibration absorbing unit 70A is not limited to one including the individual electrode layers 71*a*, the common electrode layer 71*b*, and the piezoelectric layers 71*c*. For example, the configuration of the vibration absorbing unit 70A may be such that it includes the piezoelectric layers 71*c* and the common electrode layer 71*b* and does not include the individual electrode layers 71*a*. A different thing may be disposed on the compliance substrates 23A. When the things to be laminated onto the compliance substrates 23A have the same configuration as the piezoelectric elements 50 on the vibration plate 26, the individual electrode layers 71*a*, the common electrode layer 71*b*, and the piezoelectric layers 71*c* can be laminated onto the compliance substrates 23A simultaneously with the lamination of the piezoelectric elements 50. This enables easy manufacture of the piezoelectric elements 71A on the compliance substrates 23A. The same applies also to the piezoelectric elements 71B on the compliance substrates 77B.

Modification 6

The rigidity of the supply-side compliance substrates 23A may be lower than the rigidity of the discharge-side compliance substrates 23B. For example, the compliance substrates 23A and 23B can be made different in rigidity by making their thicknesses, materials, lengths in the X-axis direction, lengths in the Y-axis direction, etc different. Also, the compliance substrates 23A and 23B can be made different in rigidity by making the configurations of the laminates on the compliance substrates 23A and 23B different. The laminates on the compliance substrates 23A and 23B include the piezoelectric elements 71A and 71B and the thin gold film 71E described above, for example.

In one of the above-described embodiments, the serial-type liquid ejecting apparatus 1, which moves the carriage 3 carrying a liquid ejecting head 10 back and forth in the width direction of the medium PA, has been exemplarily described. The present disclosure may be applied to a line-type liquid ejecting apparatus including a line head being a plurality of liquid ejecting heads 10 arrayed in a predetermined direction.

The liquid ejecting apparatus 1 exemplarily described in one of the above-described embodiments can be employed in various machines such as facsimiles and photocopiers as well as machines dedicated for printing. Nonetheless, the application of the liquid ejecting apparatus of the present disclosure is not limited to printing. For example, a liquid ejecting apparatus that ejects a solution of a colorant may be utilized as a manufacturing apparatus that forms a color filter of a display apparatus, such as a liquid crystal display panel. A liquid ejecting apparatus that ejects a solution of an electrically conductive material may be utilized as a manufacturing apparatus that forms wirings or electrodes of a wiring substrate. A liquid ejecting apparatus that ejects a solution of a biological organic substance may be utilized as a manufacturing apparatus that manufactures a biochip, for example.

What is claimed is:

1. A liquid ejecting head comprising:
a nozzle from which a liquid is ejected;
a pressure chamber in which a pressure is applied to the liquid;
a supply flow channel which is located on one side in a first direction relative to the pressure chamber and through which the liquid is supplied to the pressure chamber;
a discharge flow channel which is located on another side in the first direction relative to the pressure chamber and through which the liquid is discharged from the pressure chamber;
a supply-side compliance substrate which is provided so as to face the supply flow channel and absorbs a vibration of the liquid in the supply flow channel; and
a discharge-side compliance substrate which is provided so as to face the discharge flow channel and absorbs a vibration of the liquid in the discharge flow channel, wherein
a length of the discharge-side compliance substrate in the first direction is shorter than a length of the supply-side compliance substrate in the first direction; and
wherein rigidity of the supply-side compliance substrate is lower than rigidity of the discharge-side compliance substrate.

2. The liquid ejecting head according to claim 1, wherein compliability of the discharge-side compliance substrate is lower than compliability of the supply-side compliance substrate.

3. The liquid ejecting head according to claim 2, further comprising a pressure chamber array being a plurality of the pressure chambers arrayed in a predetermined direction, wherein
the supply-side compliance substrate is provided in common for the plurality of pressure chambers, and
the discharge-side compliance substrate is provided individually for the plurality of pressure chambers.

4. The liquid ejecting head according to claim 1, wherein inertance of the discharge flow channel is higher than inertance of the supply flow channel.

5. The liquid ejecting head according to claim 1, wherein a length of the discharge flow channel in the first direction is longer than a length of the supply flow channel in the first direction.

6. The liquid ejecting head according to claim 1, further comprising:
a second supply-side compliance substrate being different from the supply-side compliance substrate and provided upstream of the supply flow channel; and
a second discharge-side compliance substrate being different from the discharge-side compliance substrate and provided downstream of the discharge flow channel.

7. The liquid ejecting head according to claim 6, wherein the second supply-side compliance substrate and the second discharge-side compliance substrate are provided along a second direction crossing the first direction.

8. The liquid ejecting head according to claim 7, wherein a length of the second supply-side compliance substrate in the second direction is equal to a length of the second discharge-side compliance substrate in the second direction.

9. The liquid ejecting head according to claim 1, wherein the supply-side compliance substrate and the discharge-side compliance substrate are disposed so as to be separated from each other in the first direction.

10. The liquid ejecting head according to claim 9, wherein the pressure chamber is located between the supply-side compliance substrate and the discharge-side compliance substrate in the first direction.

11. The liquid ejecting head according to claim 10, further comprising:
a piezoelectric element which is provided for the pressure chamber and changes a pressure on the liquid in the pressure chamber; and
a wiring substrate electrically coupled to the piezoelectric element, wherein
the wiring substrate is located between the discharge-side compliance substrate and the pressure chamber as viewed from a third direction oriented along a thickness direction of the discharge-side compliance substrate.

12. The liquid ejecting head according to claim 1, further comprising:
a pressure chamber substrate including the pressure chamber;
a nozzle substrate including the nozzle; and
a communication plate including part of the supply flow channel and part of the discharge flow channel, and provided between the pressure chamber substrate and the nozzle substrate, wherein
the supply flow channel is flow channels in the communication plate and the pressure chamber substrate provided upstream of the pressure chamber, and
the discharge flow channel is flow channels in the communication plate and the pressure chamber substrate provided downstream of the pressure chamber.

13. A liquid ejecting apparatus comprising:
the liquid ejecting head according to claim 1; and
a control unit which controls an ejection operation of ejecting a liquid from the liquid ejecting head.

* * * * *